US012271647B2

United States Patent
Gurgul et al.

(10) Patent No.: US 12,271,647 B2
(45) Date of Patent: Apr. 8, 2025

(54) EXTENDING USER INTERFACES OF MOBILE APPS TO AR EYEWEAR

(71) Applicants: Piotr Gurgul, Hergiswil (CH); Sharon Moll, Wetzikon (CH)

(72) Inventors: Piotr Gurgul, Hergiswil (CH); Sharon Moll, Wetzikon (CH)

(73) Assignee: Snap Inc., Santa Monica, CA (US)

( * ) Notice: Subject to any disclaimer, the term of this patent is extended or adjusted under 35 U.S.C. 154(b) by 235 days.

(21) Appl. No.: 17/897,395

(22) Filed: Aug. 29, 2022

(65) Prior Publication Data
US 2024/0069843 A1 Feb. 29, 2024

(51) Int. Cl.
| | | |
|---|---|---|
| H04W 76/00 | (2018.01) | |
| G02B 27/01 | (2006.01) | |
| G06F 3/0484 | (2022.01) | |
| G06F 3/14 | (2006.01) | |
| G06F 9/451 | (2018.01) | |
| H04W 76/14 | (2018.01) | |

(52) U.S. Cl.
CPC ........... *G06F 3/14* (2013.01); *G02B 27/0172* (2013.01); *G06F 3/0484* (2013.01); *G06F 9/451* (2018.02); *H04W 76/14* (2018.02); *G02B 2027/014* (2013.01); *G02B 2027/0178* (2013.01)

(58) Field of Classification Search
CPC .......... G06F 3/14; G06F 3/0484; G06F 9/451; H04W 76/14; G02B 27/0172; G06B 2027/014; G06B 2027/0178
See application file for complete search history.

(56) References Cited

U.S. PATENT DOCUMENTS

| | | | |
|---|---|---|---|
| 8,184,068 B1 * | 5/2012 | Rhodes | G02B 27/0176 348/115 |
| 11,417,091 B2 | 8/2022 | Wright et al. | |
| 2013/0007668 A1 * | 1/2013 | Liu | G06F 3/012 715/841 |
| 2013/0017789 A1 * | 1/2013 | Chi | G02B 27/01 455/41.2 |

(Continued)

OTHER PUBLICATIONS

International Search Report and Written Opinion for International Application No. PCT/US2023/028257, dated Nov. 8, 2023 (Aug. 11, 2023)—9 pages.

*Primary Examiner* — Mahelet Shiberou
(74) *Attorney, Agent, or Firm* — CM Law; Stephen J. Weed

(57) ABSTRACT

An architecture is provided for packaging visual overlay-based user interfaces (UIs) into mobile device applications to work as user interface extensions that allow certain flows and logic to be displayed on an eyewear device when connected to the mobile device application. The extension of the UIs of the mobile device applications to the display of the eyewear device allows for inexpensive experimentation with augmented reality (AR) UIs for eyewear devices and allows for reusing of business logic across mobile devices and associated eyewear devices. For example, a mobile device application for maps or navigation may be extended to show directions on an associated eyewear device once the destination is chosen in the navigation application on the mobile device. In this example, the business logic would still live in the navigation application on the mobile device but the user would see AR directions overlaid on a display of the eyewear device.

20 Claims, 14 Drawing Sheets

FIG. 9

(56) References Cited

U.S. PATENT DOCUMENTS

| | | | |
|---|---|---|---|
| 2015/0340010 A1* | 11/2015 | Travers | G06F 3/14 |
| | | | 345/520 |
| 2017/0076502 A1 | 3/2017 | Chen et al. | |
| 2022/0179448 A1 | 6/2022 | Farahbod et al. | |
| 2022/0196427 A1 | 6/2022 | Woo et al. | |
| 2023/0076953 A1* | 3/2023 | Singh | G06Q 20/108 |
| 2023/0146677 A1* | 5/2023 | Woo | G06Q 50/10 |
| | | | 345/156 |
| 2023/0325263 A1* | 10/2023 | Shin | G06F 9/547 |
| | | | 719/330 |
| 2024/0355069 A1* | 10/2024 | Lim | H04L 9/40 |

* cited by examiner

EXTENDING USER INTERFACES OF MOBILE APPS TO AR EYEWEAR

TECHNICAL FIELD

The present disclosure relates to user interfaces for electronic devices, including augmented reality (AR)-enabled wearable electronic devices such as smart glasses. More particularly, but not by way of limitation, the present disclosure describes techniques for extending user interfaces of applications developed for mobile devices such as smartphones to enable rendering of parts of the user interfaces on smart glasses.

BACKGROUND

AR devices (such as smart glasses) are similar to mobile phones but typically more limited when it comes to available resources (battery life, thermal pressure, memory, quality of internet access, location data) and user input (no keyboard, trackpad, mouse or touch screen). Additionally, developing experiences for such AR devices requires a significant investment which can be a barrier for existing mobile application developers. This is compounded by the fact that user interfaces (UIs) of applications developed for mobile phone applications do not generally translate to eyewear devices.

BRIEF DESCRIPTION OF THE DRAWINGS

Features of the various implementations disclosed will be readily understood from the following detailed description, in which reference is made to the appended drawing figures. A reference numeral is used with each element in the description and throughout the several views of the drawing. When a plurality of similar elements is present, a single reference numeral may be assigned to like elements.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
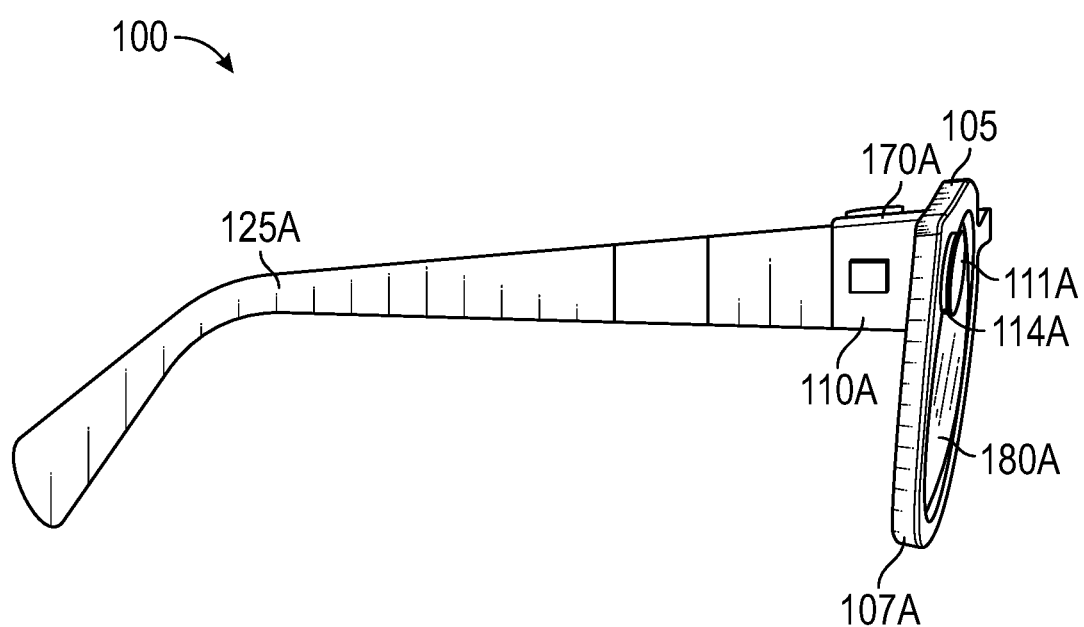
FIG. 1A is a side view of an example eyewear device including an optical assembly with an image display.

The system and methods described herein relate to an architecture for seamlessly packaging visual overlay user interfaces (UIs) into mobile device applications to work as user interface extensions that allow certain flows and logic to be displayed on an eyewear device, when connected to the mobile device application, without the need to create a new eyewear device-specific visual overlay or experience. The extension of the UIs of the mobile device applications to the display of the eyewear device allows for inexpensive experimentation with augmented reality UIs for eyewear devices for a broad community of application developers. Extension of the UIs of mobile device applications to the display of the eyewear device also allows for reusing of business logic across mobile devices and associated eyewear devices. The techniques described herein also enable incremental additions to eyewear device application flows wherever desired.

In sample configurations, the system and methods described herein provide a simple way of extending existing mobile device applications to enable rendering parts of their UIs using visual overlay UIs on eyewear devices. For example, the visual overlays could be implemented as lenses implemented in Snapchat and available and overlaid on SPECTACLES™, both available from Snap, Inc. of Santa Monica, CA. For instance, an existing mobile device application for maps or navigation may be extended to show directions on an associated eyewear device once the destination is chosen in the navigation application on the mobile device. In this example, the business logic would still live (e.g., execute) in the navigation application on the mobile device but the user would be able to see Augmented Reality (AR) directions on the associated eyewear device.

The system and method described herein enable a mobile device to provide user interfaces for mobile device applications executed thereon to an eyewear device. The mobile device establishes a wireless connection with the eyewear device and loads to the eyewear device, via the wireless connection, visual overlays adapted for the eyewear device for at least one user interface of the mobile device application. The mobile device application is adapted to enable a user to select an eyewear display mode for displaying one or more of the loaded visual overlays adapted for the eyewear device during execution of the mobile device application, and a selection of at least one of the loaded visual overlays for overlay on a display of the eyewear device as an output of the mobile device application is provided to the eyewear device.

The communications of the UI visual overlays with the eyewear device may be established in one of at least two different configurations. In a first configuration, the eyewear device includes eyewear UI extensions software including a background service that is executed to establish the wireless connection with the eyewear device. The background service exposes a service to the mobile device application for communicating with the eyewear device via the wireless connection. The mobile device application further uses an exposed service of the eyewear UI extensions software to register itself as an eyewear extension. The exposed service of the eyewear UI extensions software may further maintain a list of active registered mobile device applications. In a second configuration, an operating system of the mobile device includes an eyewear connectivity service that is executed to establish the wireless connection with the eyewear device. The eyewear connectivity service is exposed to the mobile device application for communicating with the eyewear device via the wireless connection. The mobile device application indicates that it contains an eyewear UI extension by declaring an eyewear category in its operating system manifest. An eyewear connectivity service of the operating system maintains a list of active mobile device applications in the declared eyewear category.

In other configurations, the mobile device may further include an eyewear Software Development Kit (SDK) that provides an interface for managing connectivity between the mobile device application and the eyewear device via the wireless connection. The eyewear SDK provides layouts for the visual overlays that enable definition of a layout for the loaded visual overlays in a descriptive way and use of data bindings to set and update data provided to the eyewear device via the wireless connection. In sample configurations, the layouts comprise XML, files that are added to resources of the mobile device application. The mobile device application may further present an icon on the display indicating connectivity status of the mobile device and the eyewear.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

The orientations of the eyewear device, associated components and any complete devices incorporating an eye scanner and camera such as shown in any of the drawings, are given by way of example only, for illustration and discussion purposes. In operation for a particular variable optical processing application, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Reference now is made in detail to the examples illustrated in the accompanying drawings and discussed below. A sample eyewear device and associated system and method for extending user interfaces of mobile device applications to eyewear devices will be described with respect to FIGS. 1-10.

The system described herein includes three types of hardware components: an eyewear device, a mobile device, and a server. The eyewear device will be described with respect to FIGS. 1-3, the mobile device will be described with respect to FIG. 5, and the server will be described with respect to FIG. 6. The corresponding system will be described with respect to FIG. 4. Operation of the software components, including application software on the eyewear device and mobile device, as well as examples of system operation, will be described with respect to FIGS. 7-10. Such software components include system software for tethering an eyewear device to a mobile device for receiving UIs from an application on the mobile device for display as, for example, AR overlays on the display of the eyewear device.

In sample configurations, eyewear devices with augmented reality (AR) capability are used in the systems described herein. Eyewear devices are desirable to use in the system described herein as such devices are scalable, customizable to enable personalized experiences, enable effects to be applied anytime, anywhere, and ensure user privacy by enabling only the user to see the transmitted information. An eyewear device such as SPECTACLES™ available from Snap, Inc. of Santa Monica, California, may be used without any specialized hardware in a sample configuration.

Figure 2A:
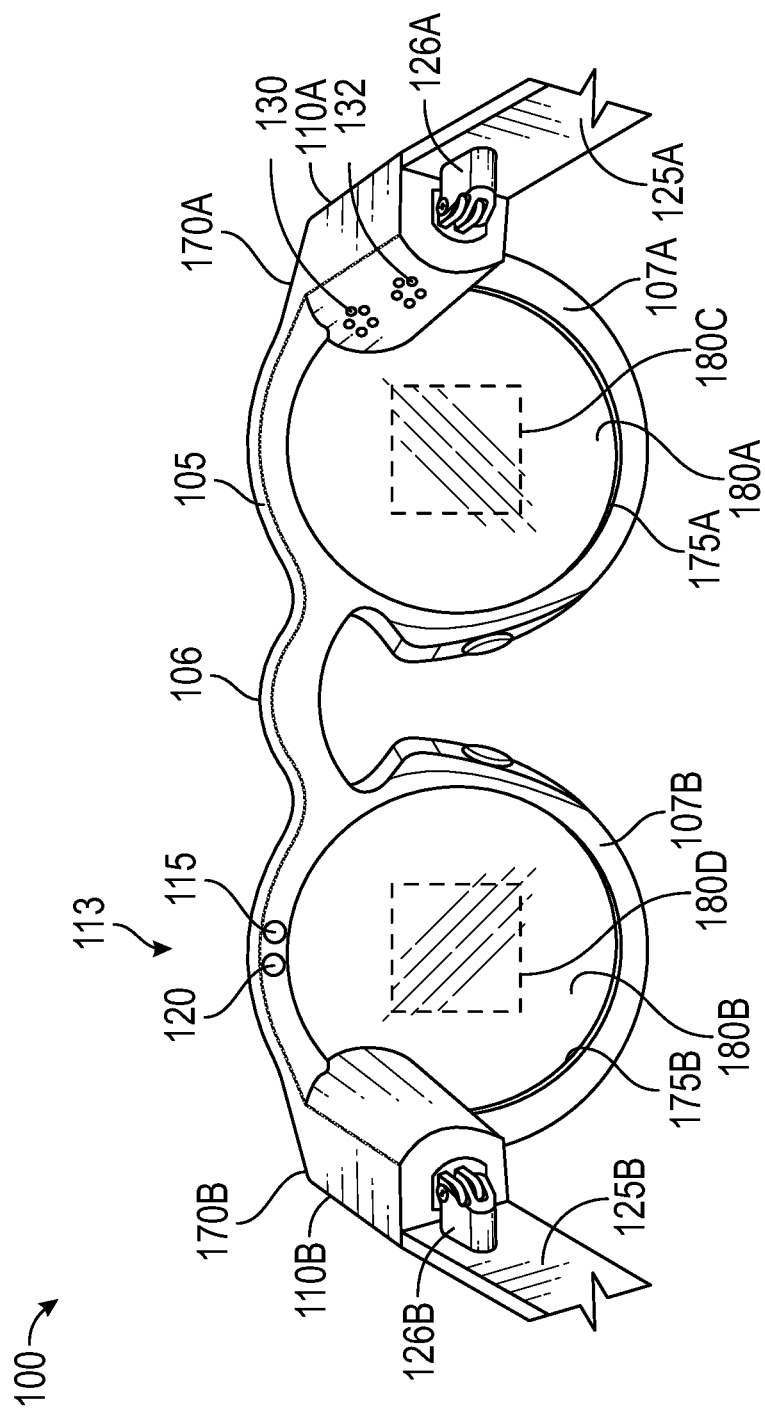
FIGS. 2A-2D are rear views of an example eyewear device depicting an image display.

FIG. 1A is an illustration depicting a side view of an example hardware configuration of an eyewear device 100 including an optical assembly 180A with an image display 180C (FIG. 2A). Eyewear device 100 includes multiple visible light cameras 114A and 114B (FIG. 3) that form a stereo camera, of which the first visible light camera 114A is located on a right temple 110A and the second visible light camera 114B is located on a left temple 110B (FIG. 2A). In the illustrated example, the optical assembly 180A is located on the right side of the eyewear device 100. The optical assembly 180A can be located on the left side or other locations of the eyewear devices 100.

Figure 3:
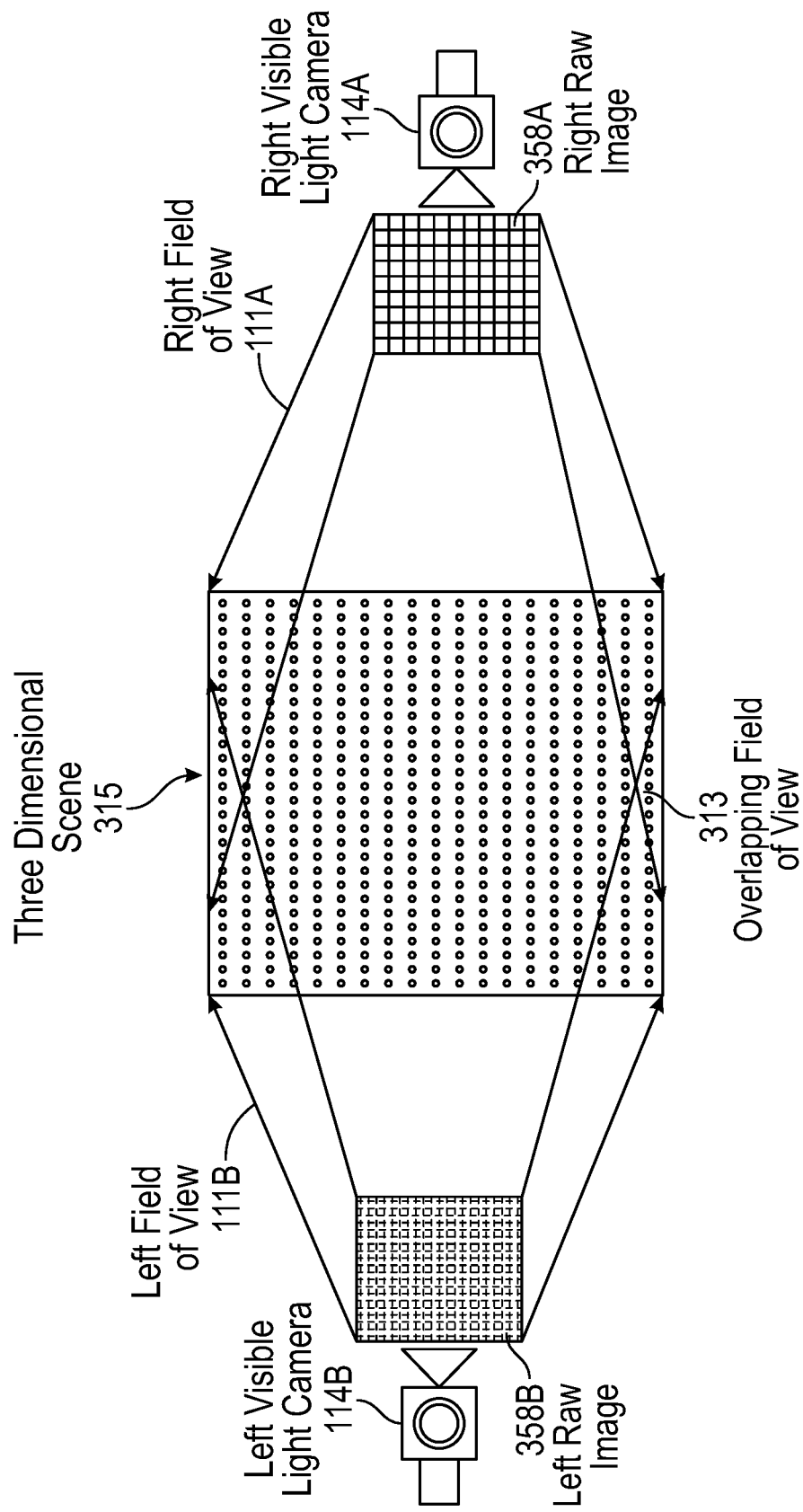
FIG. 3 is a block diagram illustrating an example of capturing visible light using an example eyewear device illustrated in any of the proceeding figures.

The visible light cameras 114A and 114B may include an image sensor that is sensitive to the visible light range wavelength. Each of the visible light cameras 114A and 114B has a different frontward facing angle of coverage, for example, visible light camera 114A has the depicted angle of coverage 111A (FIG. 3). The angle of coverage is an angle range in which the respective image sensor of the visible light cameras 114A and 114B detects incoming light and generates image data. Examples of such visible lights cameras 114A and 114B include a high-resolution complementary metal-oxide-semiconductor (CMOS) image sensor and a video graphic array (VGA) camera, such as 640p (e.g., 640×480 pixels for a total of 0.3 megapixels), 720p, 1080p, 4K, or 8K. Image sensor data from the visible light cameras 114A and 114B may be captured along with geolocation data, digitized by an image processor, and stored in a memory.

To provide stereoscopic vision, visible light cameras 114A and 114B may be coupled to an image processor (element 412 of FIG. 4) for digital processing and adding a timestamp corresponding to the scene in which the image is captured. Image processor 412 may include circuitry to receive signals from the visible light cameras 114A and 114B and to process those signals from the visible light cameras 114A and 114B into a format suitable for storage in the memory (element 434 of FIG. 4). The timestamp may be added by the image processor 412 or other processor that controls operation of the visible light cameras 114A and 114B. Visible light cameras 114A and 114B allow the stereo camera to simulate human binocular vision. Stereo cameras also provide the ability to reproduce three-dimensional images of a three-dimensional scene (scene 315 of FIG. 3) based on two captured images (image pairs 358A and 358B of FIG. 3) from the visible light cameras 114A and 114B, respectively, having the same timestamp. Such three-dimensional images allow for an immersive virtual experience that feels realistic, e.g., for virtual reality or video gaming. For stereoscopic vision, the pair of images 358A and 358B may be generated at a given moment in time—one image for each of the visible light cameras 114A and 114B. When the pair of generated images 358A and 358B from the frontward facing field of view (FOV) 111A and 111B of the visible light cameras 114A and 114B are stitched together (e.g., by the image processor 412), depth perception is provided by the optical assemblies 180A and 180B.

In an example, the eyewear device 100 includes a frame 105, a right rim 107A, a right temple 110A extending from a right lateral side 170A of the frame 105, and a see-through image display 180C (FIGS. 2A-B) comprising optical assembly 180A to present a GUI or other image to a user. The eyewear device 100 includes the first visible light camera 114A connected to the frame 105 or the right temple 110A to capture a first image of the scene. Eyewear device 100 further includes the second visible light camera 114B connected to the frame 105 or the left temple 110B to capture (e.g., simultaneously with the first visible light camera 114A) a second image of the scene which at least partially overlaps the first image. Although not shown in FIGS. 1A and 1B, a processor 432 (FIG. 4) is coupled to the eyewear device 100 and is connected to the visible light cameras 114A and 114B and memory 434 (FIG. 4) accessible to the processor 432, and programming in the memory 434 may be provided in the eyewear device 100 itself.

Figure 1B:
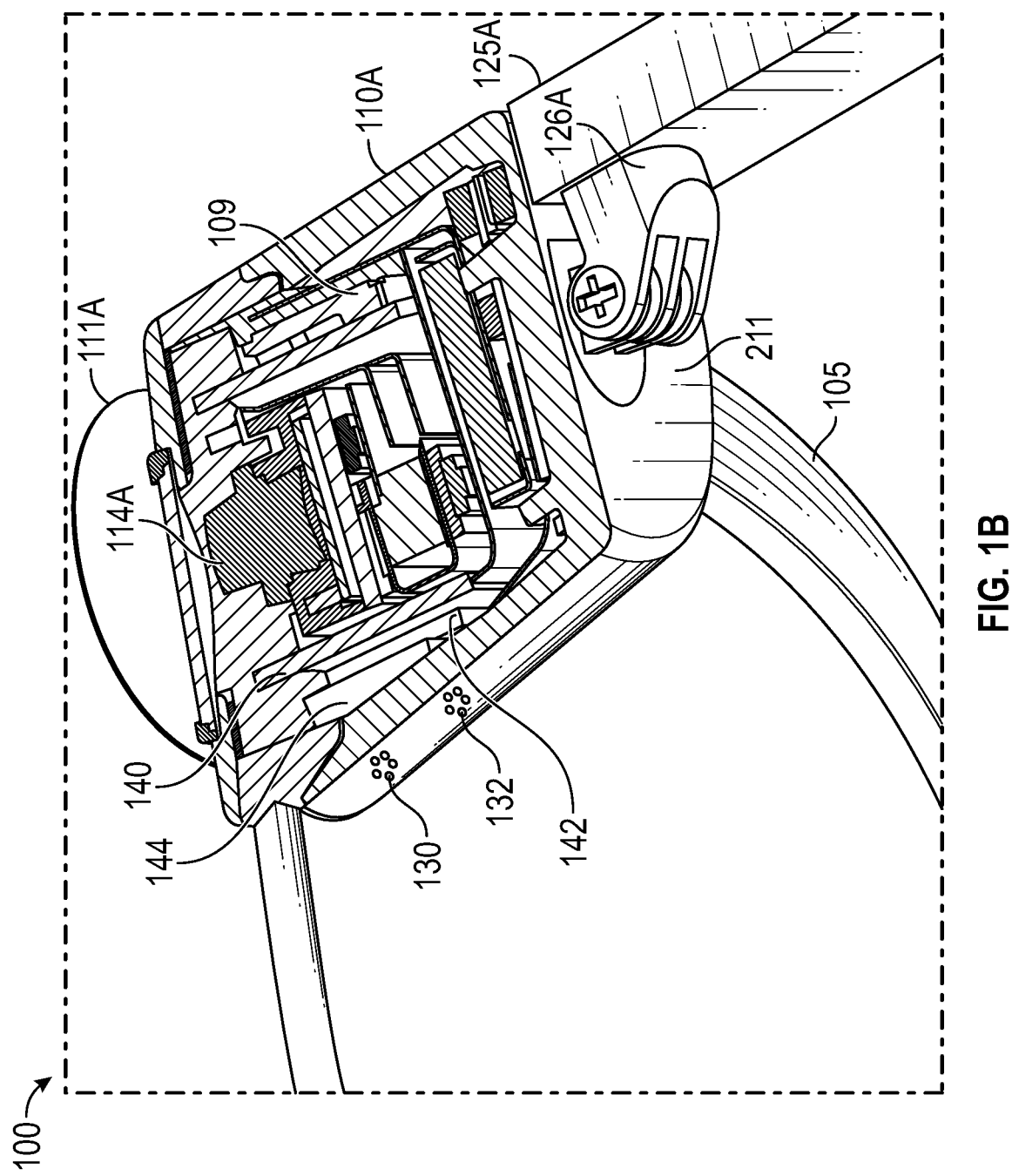
FIG. 1B is a top cross-sectional view of optical components and electronics in a portion of the eyewear device illustrated in FIG. 1A.
Figure 2B:
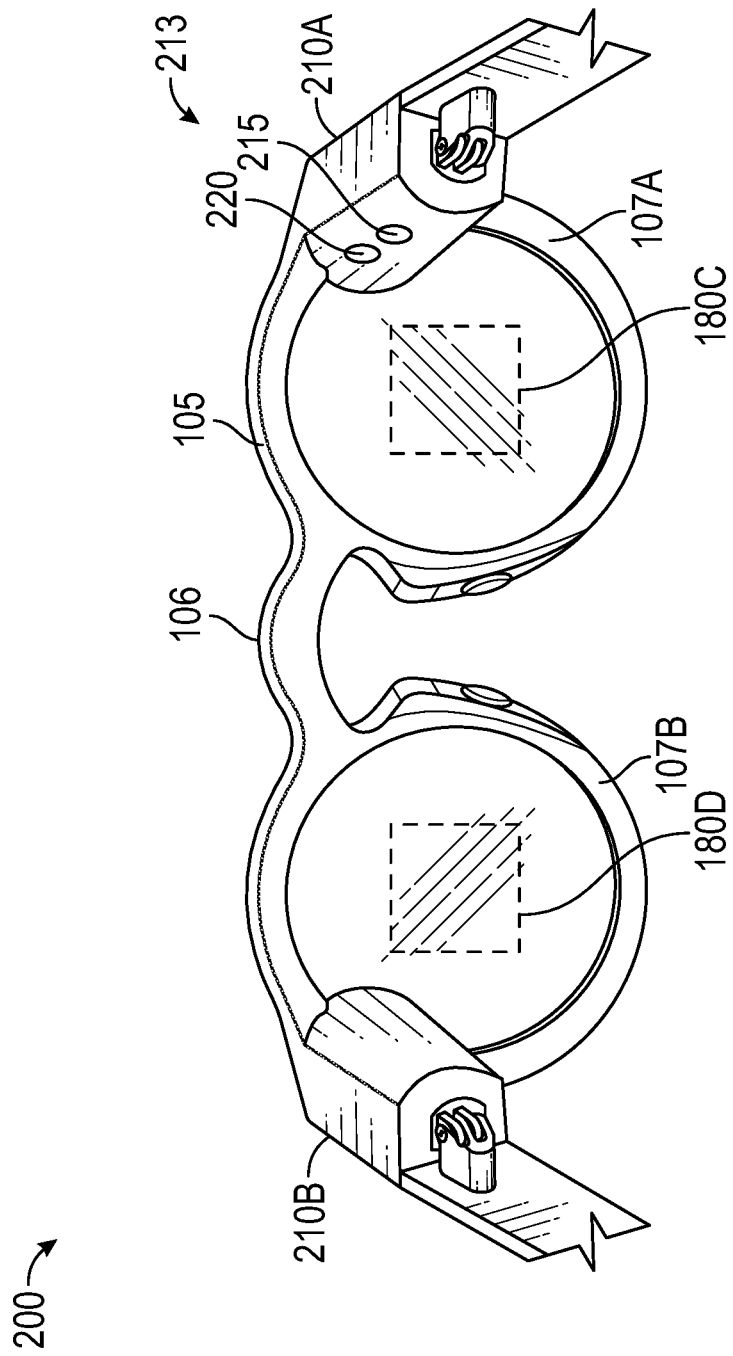
Figure 2C:
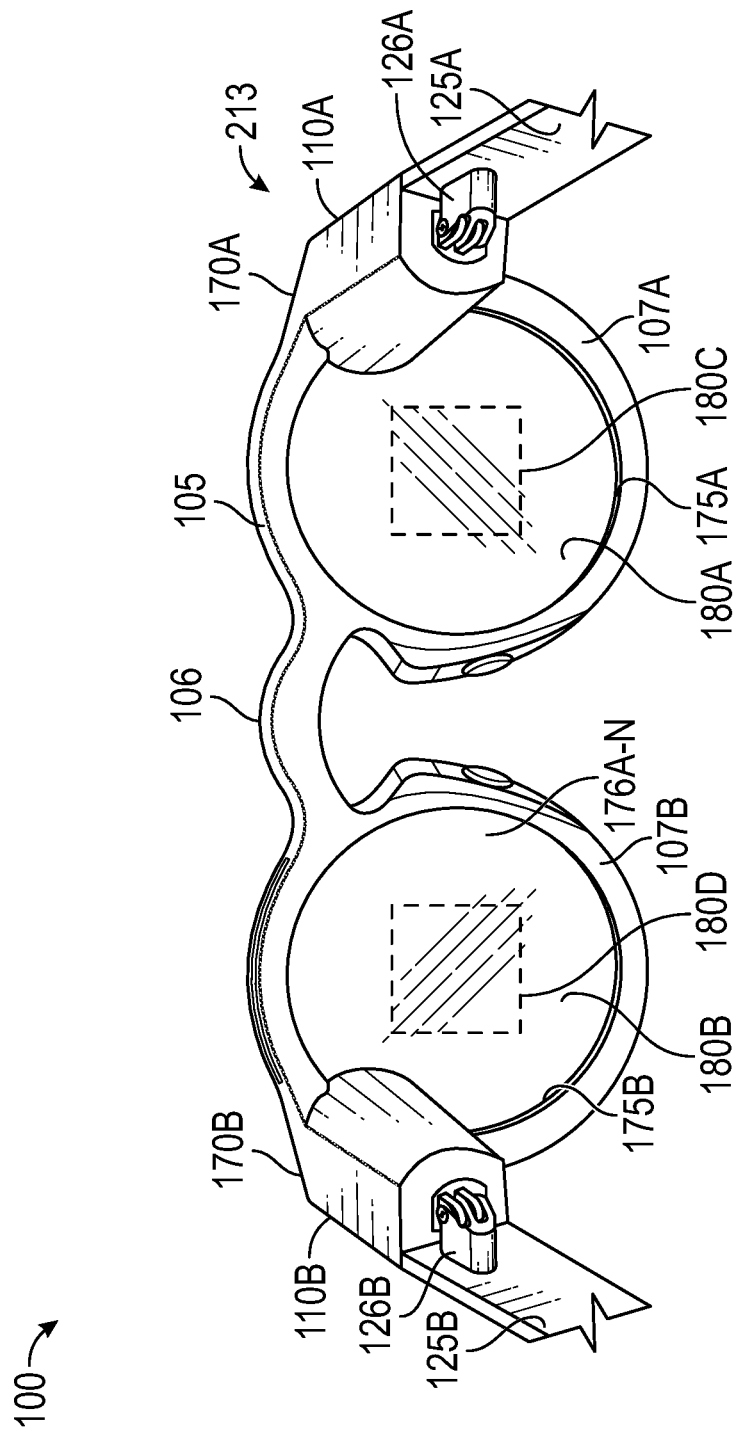

Although not shown in FIG. 1A, the eyewear device 100 also may include a head movement tracker (element 109 of FIG. 1B) or an eye movement tracker (element 113 of FIG. 2A or element 213 of FIGS. 2B and 2C). Eyewear device 100 may further include the see-through image displays 180C and D of optical assemblies 180A and 180B, respectively, for presenting a sequence of displayed images. The eyewear devices 100 may further include an image display driver (element 442 of FIG. 4) coupled to the see-through image displays 180C and 180D to drive the image displays 180C and 180D. The see-through image displays 180C and 180D and the image display driver are described in further detail below. Eyewear device 100 may further include the memory 434 and the processor 432 (FIG. 4) having access to the image display driver 442 and the memory 434, as well as programming in the memory 434. Execution of the programming by the processor 432 configures the eyewear device 100 to perform functions, including functions to present, via the see-through image displays 180C and 180D, an initial displayed image of the sequence of displayed images, the initial displayed image having an initial field of view corresponding to an initial head direction or an initial eye gaze direction as determined by the eye movement tracker 113 or 213.

Execution of the programming by the processor 432 may further configure the eyewear device 100 to detect movement of a user of the eyewear device 100 by: (i) tracking, via the head movement tracker (element 109 of FIG. 1B), a head movement of a head of the user, or (ii) tracking, via an eye movement tracker (element 113 of FIG. 2A or element 213 of FIGS. 2B and 2C), an eye movement of an eye of the user of the eyewear device 100. Execution of the programming by the processor 432 may further configure the eyewear device 100 to determine a field of view adjustment to the initial field of view of the initial displayed image based on the detected movement of the user. The field of view adjustment may include a successive field of view corresponding to a successive head direction or a successive eye direction. Execution of the programming by the processor 432 may further configure the eyewear device 100 to generate successive displayed images of the sequence of displayed images based on the field of view adjustment. Execution of the programming by the processor 432 may further configure the eyewear device 100 to present, via the see-through image displays 180C and 180D of the optical assemblies 180A and 180B, the successive displayed images.

FIG. 1B is an illustration depicting a top cross-sectional view of optical components and electronics in a portion of the eyewear device 100 illustrated in FIG. 1A depicting the first visible light camera 114A, a head movement tracker 109, and a circuit board 140A. Construction and placement of the second visible light camera 114B is substantially similar to the first visible light camera 114A, except the connections and coupling are on the other lateral side 170B (FIG. 2A). As shown, the eyewear device 100 includes the first visible light camera 114A and a circuit board, which may be a flexible printed circuit board (PCB) 140A. A first hinge 126A connects the right temple 110A to a hinged arm 125A of the eyewear device 100. In some examples, components of the first visible light camera 114A, the flexible PCB 140A, or other electrical connectors or contacts may be located on the right temple 110A or the first hinge 126A.

As shown, eyewear device 100 may include a head movement tracker 109, which includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyroscope, and magnetometer per axis for each of the three axes: horizontal axis for left-right movement (X), vertical axis (Y) for top-bottom movement, and depth or distance axis for up-down movement (Z). The accelerometer detects the gravity vector. The magnetometer defines the rotation in the magnetic field (e.g., facing south, north, etc.) like a compass that generates a heading reference. The three accelerometers detect acceleration along the horizontal, vertical, and depth axis defined above, which can be defined relative to the ground, the eyewear device 100, or the user wearing the eyewear device 100.

Eyewear device 100 may detect movement of the user of the eyewear device 100 by tracking, via the head movement tracker 109, the head movement of the user's head. The head movement includes a variation of head direction on a horizontal axis, a vertical axis, or a combination thereof from the initial head direction during presentation of the initial displayed image on the image display. In one example, tracking, via the head movement tracker 109, the head movement of the user's head includes measuring, via the inertial measurement unit, the initial head direction on the horizontal axis (e.g., X axis), the vertical axis (e.g., Y axis), or the combination thereof (e.g., transverse or diagonal movement). Tracking, via the head movement tracker 109, the head movement of the user's head further includes measuring, via the inertial measurement unit, a successive head direction on the horizontal axis, the vertical axis, or the combination thereof during presentation of the initial displayed image.

Tracking, via the head movement tracker 109, the head movement of the user's head may include determining the variation of head direction based on both the initial head direction and the successive head direction. Detecting movement of the user of the eyewear device 100 may further include in response to tracking, via the head movement tracker 109, the head movement of the user's head, determining that the variation of head direction exceeds a deviation angle threshold on the horizontal axis, the vertical axis, or the combination thereof. In sample configurations, the deviation angle threshold is between about 3° to 10°. As used herein, the term "about" when referring to an angle means±10% from the stated amount.

Variation along the horizontal axis slides three-dimensional objects, such as characters, Bitmojis, application icons, etc. in and out of the field of view by, for example, hiding, unhiding, or otherwise adjusting visibility of the three-dimensional object. Variation along the vertical axis, for example, when the user looks upwards, in one example, displays weather information, time of day, date, calendar appointments, etc. In another example, when the user looks downwards on the vertical axis, the eyewear device 100 may power down.

As shown in FIG. 1B, the right temple 110A includes temple body 211 that is configured to receive a temple cap, with the temple cap omitted in the cross-section of FIG. 1B. Disposed inside the right temple 110A are various interconnected circuit boards, such as PCBs or flexible PCBs 140A, that include controller circuits for first visible light camera 114A, microphone(s) 130, speaker(s) 132, low-power wireless circuitry (e.g., for wireless short-range network communication via BLUETOOTH®), and high-speed wireless circuitry (e.g., for wireless local area network communication via WI-FI®).

The first visible light camera 114A is coupled to or disposed on the flexible PCB 140A and covered by a visible light camera cover lens, which is aimed through opening(s) formed in the right temple 110A. In some examples, the frame 105 connected to the right temple 110A includes the opening(s) for the visible light camera cover lens. The frame 105 may include a front-facing side configured to face outwards away from the eye of the user. The opening for the visible light camera cover lens may be formed on and through the front-facing side. In the example, the first visible light camera 114A has an outward facing angle of coverage 111A with a line of sight or perspective of the right eye of the user of the eyewear device 100. The visible light camera cover lens also can be adhered to an outward facing surface of the right temple 110A in which an opening is formed with an outward facing angle of coverage, but in a different outwards direction. The coupling can also be indirect via intervening components.

The first visible light camera 114A may be connected to the first see-through image display 180C of the first optical assembly 180A to generate a first background scene of a first successive displayed image. The second visible light camera 114B may be connected to the second see-through image display 180D of the second optical assembly 180B to generate a second background scene of a second successive displayed image. The first background scene and the second background scene may partially overlap to present a three-dimensional observable area of the successive displayed image.

Flexible PCB 140A may be disposed inside the right temple 110A and coupled to one or more other components housed in the right temple 110A. Although shown as being formed on the circuit boards 140A of the right temple 110A, the first visible light camera 114A can be formed on another circuit board (not shown) in one of the left temple 110B, the hinged arm 125A, the hinged arm 125B, or the frame 105.

FIG. 2A is an illustration depicting a rear view of an example hardware configuration of an eyewear device 100. As shown in FIG. 2A, the eyewear device 100 is in a form configured for wearing by a user, which are eyeglasses in the example of FIG. 2A. The eyewear device 100 can take other forms and may incorporate other types of frameworks, for example, a headgear, a headset, or a helmet.

In the eyeglasses example, eyewear device 100 includes the frame 105 which includes the right rim 107A connected to the left rim 107B via the bridge 106, which is configured to receive a nose of the user. The right and left rims 107A and 107B include respective apertures 175A and 175B, which hold the respective optical elements 180A and 180B, such as a lens and the see-through displays 180C and 180D. As used herein, the term lens is meant to cover transparent or translucent pieces of glass or plastic having curved and flat surfaces that cause light to converge/diverge or that cause little or no convergence/divergence.

Although shown as having two optical elements 180A and 180B, the eyewear device 100 can include other arrangements, such as a single optical element depending on the application or intended user of the eyewear device 100. As further shown, eyewear device 100 includes the right temple 110A adjacent the right lateral side 170A of the frame 105 and the left temple 110B adjacent the left lateral side 170B of the frame 105. The temples 110A and 110B may be integrated into the frame 105 on the respective sides 170A and 170B (as illustrated) or implemented as separate components attached to the frame 105 on the respective sides 170A and 170B. Alternatively, the temples 110A and 110B may be integrated into hinged arms 125A and 125B attached to the frame 105.

In the example of FIG. 2A, an eye scanner 113 is provided that includes an infrared emitter 115 and an infrared camera 120. Visible light cameras typically include a blue light filter to block infrared light detection. In an example, the infrared camera 120 is a visible light camera, such as a low-resolution video graphic array (VGA) camera (e.g., 640×480 pixels for a total of 0.3 megapixels), with the blue filter removed. The infrared emitter 115 and the infrared camera 120 may be co-located on the frame 105. For example, both are shown as connected to the upper portion of the left rim 107B. The frame 105 or one or more of the temples 110A and 110B may include a circuit board (not shown) that includes the infrared emitter 115 and the infrared camera 120. The infrared emitter 115 and the infrared camera 120 can be connected to the circuit board by soldering, for example.

Other arrangements of the infrared emitter 115 and infrared camera 120 may be implemented, including arrangements in which the infrared emitter 115 and infrared camera 120 are both on the right rim 107A, or in different locations on the frame 105. For example, the infrared emitter 115 may be on the left rim 107B and the infrared camera 120 may be on the right rim 107A. In another example, the infrared emitter 115 may be on the frame 105 and the infrared camera 120 may be on one of the temples 110A or 110B, or vice versa. The infrared emitter 115 can be connected essentially anywhere on the frame 105, right temple 110A, or left temple 110B to emit a pattern of infrared light. Similarly, the infrared camera 120 can be connected essentially anywhere on the frame 105, right temple 110A, or left temple 110B to capture at least one reflection variation in the emitted pattern of infrared light.

The infrared emitter 115 and infrared camera 120 may be arranged to face inwards towards an eye of the user with a partial or full field of view of the eye to identify the respective eye position and gaze direction. For example, the infrared emitter 115 and infrared camera 120 may be positioned directly in front of the eye, in the upper part of the frame 105 or in the temples 110A or 110B at either ends of the frame 105.

FIG. 2B is an illustration depicting a rear view of an example hardware configuration of another eyewear device 200. In this example configuration, the eyewear device 200 is depicted as including an eye scanner 213 on a right temple 210A. As shown, an infrared emitter 215 and an infrared camera 220 are co-located on the right temple 210A. The eye scanner 213 or one or more components of the eye scanner 213 can be located on the left temple 210B and other locations of the eyewear device 200, for example, the frame 105. The infrared emitter 215 and infrared camera 220 are like that of FIG. 2A, but the eye scanner 213 can be varied to be sensitive to different light wavelengths as described previously in FIG. 2A. Similar to FIG. 2A, the eyewear device 200 includes a frame 105 which includes a right rim 107A which is connected to a left rim 107B via a bridge 106. The rims 107A-B may include respective apertures which hold the respective optical elements 180A and 180B comprising the see-through displays 180C and 180D.

Figure 2D:
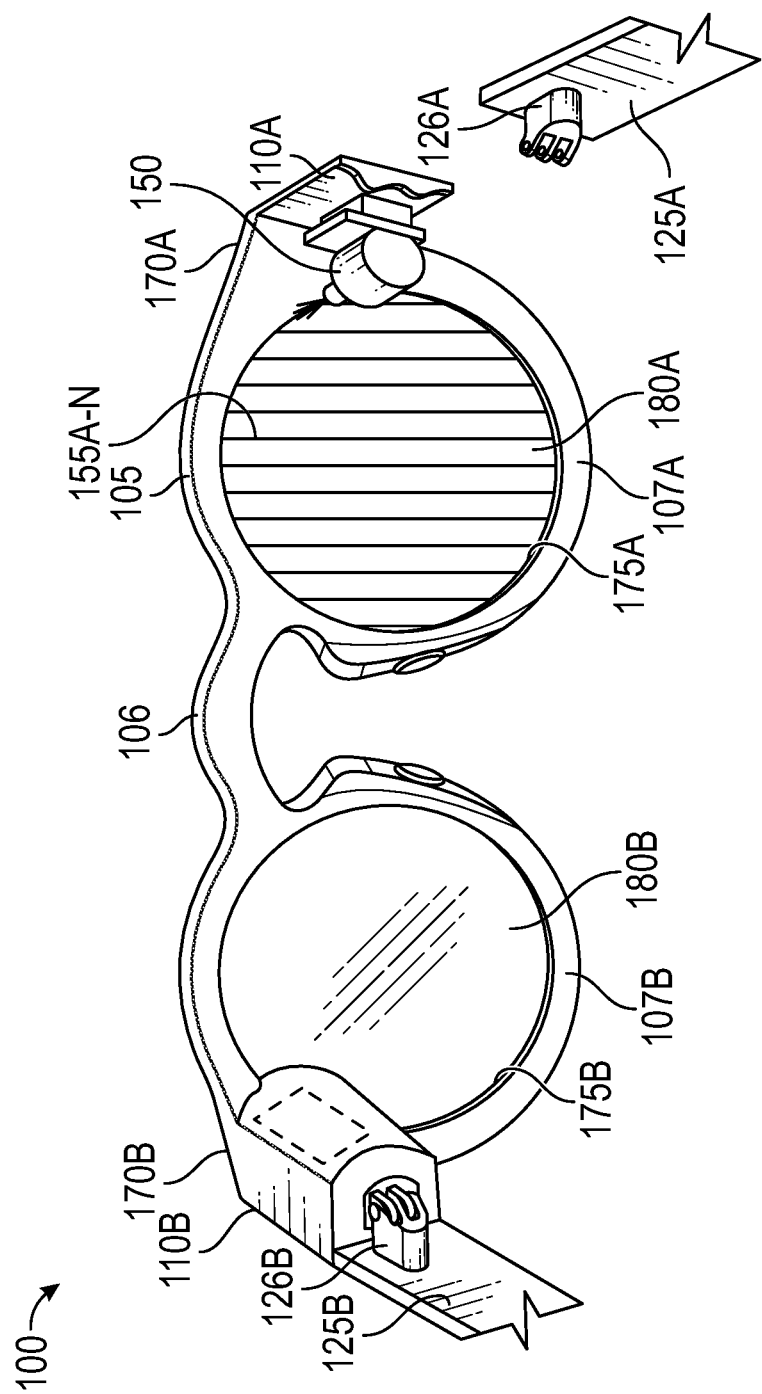

FIG. 2C and FIG. 2D are illustrations depicting rear views of example hardware configurations of the eyewear device 100, including two different types of see-through image displays 180C and 180D. In one example, these see-through image displays 180C and 180D of optical assemblies 180A and 180B include an integrated image display. As shown in FIG. 2C, the optical assemblies 180A and 180B include a display matrix 180C and 180D of any suitable type, such as a liquid crystal display (LCD), an organic light-emitting diode (OLED) display, a waveguide display, or any other such display.

The optical assemblies 180A and 180B also include an optical layer or layers 176A-N, which can include lenses, optical coatings, prisms, mirrors, waveguides, optical strips, and other optical components in any combination. The optical layers 176 can include a prism having a suitable size and configuration and including a first surface for receiving light from display matrix and a second surface for emitting light to the eye of the user. The prism of the optical layers 176 may extend over all or at least a portion of the respective apertures 175A and 175B formed in the rims 107A and 107B to permit the user to see the second surface of the prism when the eye of the user is viewing through the corresponding rims 107A and 107B. The first surface of the prism of the optical layers 176 faces upwardly from the frame 105 and the display matrix overlies the prism so that photons and light emitted by the display matrix impinge the first surface. The prism may be sized and shaped so that the light is refracted within the prism and is directed towards the eye of the user by the second surface of the prism of the optical layers 176. In this regard, the second surface of the prism of the optical layers 176 can be convex to direct the light towards the center of the eye. The prism can be sized and shaped to magnify the image projected by the see-through image displays 180C and 180D, and the light travels through the prism so that the image viewed from the second surface is larger in one or more dimensions than the image emitted from the see-through image displays 180C and 180D.

In another example, the see-through image displays 180C and 180D of optical assemblies 180A and 180B may include a projection image display as shown in FIG. 2D. The optical assemblies 180A and 180B include a projector 150, which may be a three-color projector using a scanning mirror, a galvanometer, a laser projector, or other types of projectors. During operation, an optical source such as a projector 150 is disposed in or on one of the temples 110A or 110B of the eyewear device 100. Optical assemblies 180A and 180B may include one or more optical strips 155A-N spaced apart across the width of the lens of the optical assemblies 180A and 180B or across a depth of the lens between the front surface and the rear surface of the lens.

As the photons projected by the projector 150 travel across the lens of the optical assemblies 180A and 180B, the photons encounter the optical strips 155. When a particular photon encounters a particular optical strip, the photon is either redirected towards the user's eye, or it passes to the next optical strip. A combination of modulation of projector 150, and modulation of optical strips, may control specific photons or beams of light. In an example, a processor controls the optical strips 155 by initiating mechanical, acoustic, or electromagnetic signals. Although shown as having two optical assemblies 180A and 180B, the eyewear device 100 can include other arrangements, such as a single or three optical assemblies, or the optical assemblies 180A and 180B may have different arrangements depending on the application or intended user of the eyewear device 100.

As further shown in FIG. 2C and FIG. 2D, eyewear device 100 includes a right temple 110A adjacent the right lateral side 170A of the frame 105 and a left temple 110B adjacent the left lateral side 170B of the frame 105. The temples 110A and 110B may be integrated into the frame 105 on the respective lateral sides 170A and 170B (as illustrated) or implemented as separate components attached to the frame 105 on the respective sides 170A and 170B. Alternatively, the temples 110A and 110B may be integrated into the hinged arms 125A and 125B attached to the frame 105.

In one example, the see-through image displays include the first see-through image display 180C and the second see-through image display 180D. Eyewear device 100 may include first and second apertures 175A and 175B that hold the respective first and second optical assemblies 180A and 180B. The first optical assembly 180A may include the first see-through image display 180C (e.g., a display matrix, or optical strips and a projector in the right temple 110A). The second optical assembly 180B may include the second see-through image display 180D (e.g., a display matrix, or optical strips and a projector 150 in right temple 110A). The successive field of view of the successive displayed image may include an angle of view between about 15° to 30°, and more specifically 24°, measured horizontally, vertically, or diagonally. The successive displayed image having the successive field of view represents a combined three-dimensional observable area visible through stitching together of two displayed images presented on the first and second image displays.

As used herein, "an angle of view" describes the angular extent of the field of view associated with the displayed images presented on each of the image displays 180C and 180D of optical assemblies 180A and 180B. The "angle of coverage" describes the angle range that a lens of visible light cameras 114A or 114B or infrared camera 220 can image. Typically, the image circle produced by a lens is large enough to cover the film or sensor completely, possibly including some vignetting (i.e., a reduction of an image's brightness or saturation toward the periphery compared to the image center). If the angle of coverage of the lens does not fill the sensor, the image circle will be visible, typically with strong vignetting toward the edge, and the effective angle of view will be limited to the angle of coverage. The "field of view" is intended to describe the field of observable area which the user of the eyewear device 100 can see through his or her eyes via the displayed images presented on the image displays 180C and 180D of the optical assemblies 180A and 180B. Image display 180C of optical assemblies 180A and 180B can have a field of view with an angle of coverage between 15° to 30°, for example 24°, and have a resolution of 480×480 pixels (or greater; e.g., 720p, 1080p, 4K, or 8K).

Figure 4:
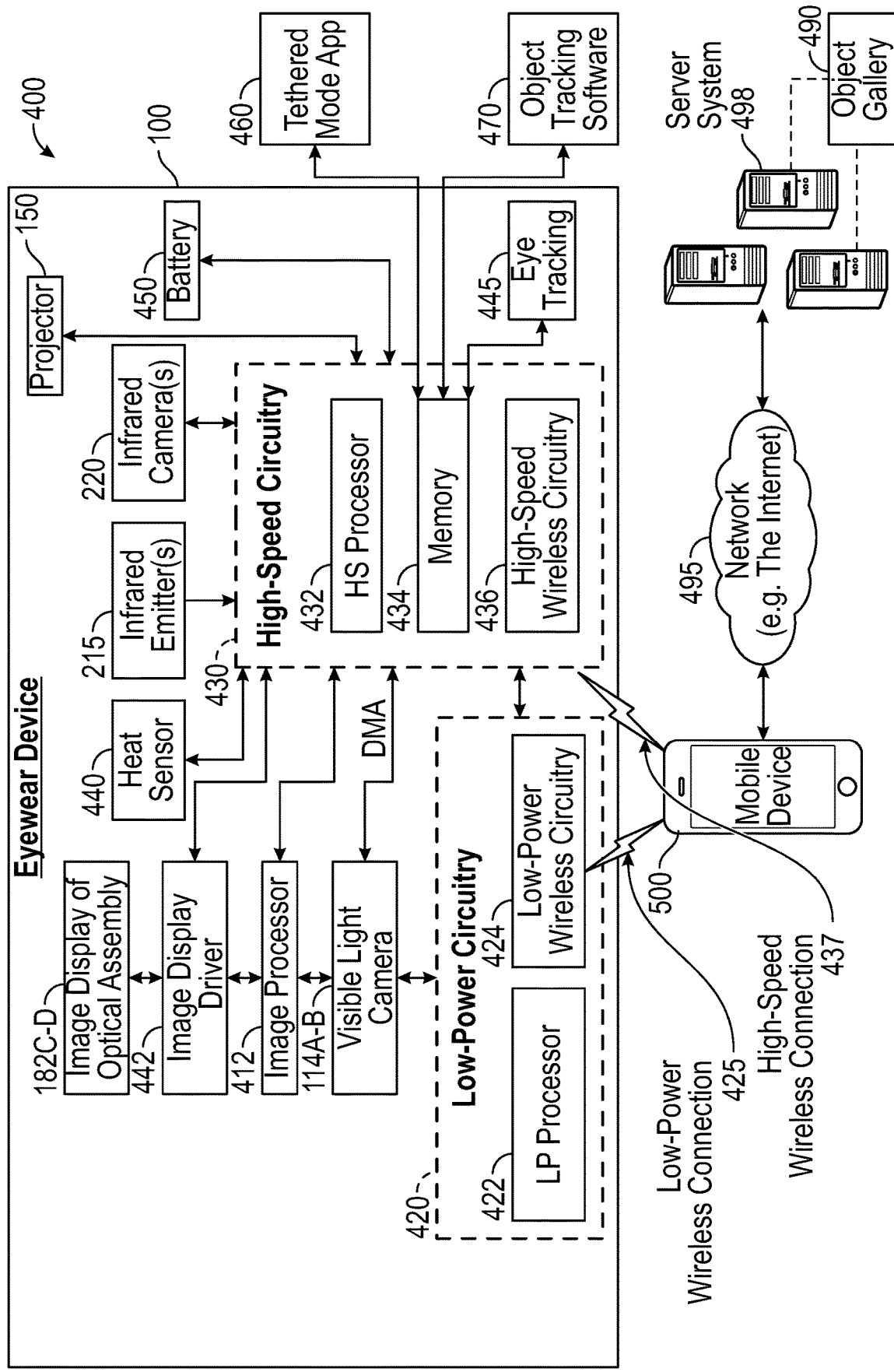
FIG. 4 is a system block diagram of an example eyewear device.

The block diagram in FIG. 3 illustrates an example of capturing visible light with cameras 114A and 114B. Visible light is captured by the first visible light camera 114A with a round field of view (FOV) 111A. A chosen rectangular first raw image 358A is used for image processing by image processor 412 (FIG. 4). Visible light is also captured by the second visible light camera 114B with a round FOV 111B. A rectangular second raw image 358B chosen by the image processor 412 is used for image processing by processor 412. The raw images 358A and 358B have an overlapping field of view 313. The processor 412 processes the raw images 358A and 358B and generates a three-dimensional image 315 for display by the displays 180C and 180D. The three-dimensional image 315 is also referred to hereafter as an immersive image.

The system block diagram in FIG. 4 illustrates a high-level functional block diagram including example electronic components disposed in eyewear device 100 or 200 in sample configurations. The illustrated electronic components include the processor 432, the memory 434, and the see-through image displays 180C and 180D.

Memory 434 includes instructions for execution by processor 432 to implement the functionality of eyewear devices 100 and 200, including instructions for high-speed processor 432 to control the image 315. Such functionality may be implemented by processing instructions of eye movement tracking programming 445, tethered mode application software 460, and object tracking software 470 that is stored in memory 434 and executed by high-speed processor 432. High speed processor 432 receives power from battery 450 and executes the instructions stored in memory 434. The memory 434 may be a separate component, or memory 434 may be integrated with the processor 432 "on-chip" to perform the functionality of eyewear devices 100 and 200 and to communicate with external devices via wireless connections.

The eyewear devices 100 and 200 may incorporate eye movement tracking programming 445 (e.g., implemented using infrared emitter 215 and infrared camera 220 in FIG. 2B) and may provide user interface adjustments via a mobile device 500 (FIG. 5) and a server system 498 connected via various networks. Mobile device 500 may be a smartphone, tablet, laptop computer, access point, or any other such device capable of connecting with the eyewear devices 100 or 200 using both a low-power wireless connection 425 and a high-speed wireless connection 437. Mobile device 500 is further connected to server system 498 via a network 495. The network 495 may include any combination of wired and wireless connections.

Eyewear devices 100 and 200 may include image display driver 442, image processor 412, low-power circuitry 420, and high-speed circuitry 430. The components shown in FIG. 4 for the eyewear devices 100 and 200 are located on one or more circuit boards, for example, a PCB or flexible PCB 140A and 140B, in the temples. Alternatively, or additionally, the depicted components can be located in the temples, frames, hinges, hinged arms, or bridge of the eyewear devices 100 and 200. The visible light cameras 114A and 114B can include digital camera elements such as a complementary metal-oxide-semiconductor (CMOS) image sensor, charge coupled device, a lens, or any other respective visible or light capturing elements that may be used to capture data, including images of scenes with unknown objects.

Eye movement tracking programming 445 implements the user interface field of view adjustment instructions, including instructions to cause the eyewear devices 100 or 200 to track, via the eye movement tracker 213, the eye movement of the eye of the user of the eyewear devices 100 or 200. Other implemented instructions (functions) cause the eyewear devices 100 and 200 to determine the FOV adjustment to the initial FOV 111A-B based on the detected eye movement of the user corresponding to a successive eye direction. Further implemented instructions generate a successive displayed image of the sequence of displayed images based on the field of view adjustment. The successive displayed image is produced as visible output to the user via the user interface. This visible output appears on the see-through image displays 180C and 180D of optical assemblies 180A and 180B, which is driven by image display driver 442 to present the sequence of displayed images, including the initial displayed image with the initial field of view and the successive displayed image with the successive field of view.

An object tracking model applied by the object tracking software 470 may, for example, detect gestures of the user as well as objects within the environment that are to be recognized by object recognition software associated with the eyewear device 100 or 200 in sample configurations.

The tethered mode application software 460 will be described in further detail below in connection with FIGS. 7-10.

As shown in FIG. 4, high-speed circuitry 430 includes high-speed processor 432, memory 434, and high-speed wireless circuitry 436. In the example, the image display driver 442 is coupled to the high-speed circuitry 430 and operated by the high-speed processor 432 in order to drive the image displays 180C and 180D of the optical assemblies 180A and 180B. High-speed processor 432 may be any processor capable of managing high-speed communications and operation of any general computing system needed for eyewear device 100 or 200. High-speed processor 432 includes processing resources needed for managing high-speed data transfers on high-speed wireless connection 437 to a wireless local area network (WLAN) using high-speed wireless circuitry 436. In certain examples, the high-speed processor 432 executes an operating system such as a LINUX operating system or other such operating system of the eyewear device 100 or 200 and the operating system is stored in memory 434 for execution. In addition to any other responsibilities, the high-speed processor 432 executing a software architecture for the eyewear device 100 or 200 is used to manage data transfers with high-speed wireless circuitry 436. In certain examples, high-speed wireless circuitry 436 is configured to implement wireless communication protocols such as Institute of Electrical and Electronic Engineers (IEEE) 802.11 communication standards, also referred to herein as WI-FI®. In other examples, other high-speed communications standards may be implemented by high-speed wireless circuitry 436.

Low-power wireless circuitry 424 and the high-speed wireless circuitry 436 of the eyewear devices 100 and 200 can include short range transceivers (BLUETOOTH®) and wireless wide, local, or wide area network transceivers (e.g., cellular or WI-FI®). Mobile device 500, including the transceivers communicating via the low-power wireless connection 425 and high-speed wireless connection 437, may be implemented using details of the architecture of the eyewear device 100 and 200, as can other elements of network 495.

Memory 434 includes any storage device capable of storing various data and applications, including, among other things, color maps, camera data generated by the visible light cameras 114A-B and the image processor 412, as well as images generated for display by the image display driver 442 on the see-through image displays 180C and 180D of the optical assemblies 180A and 180B. While memory 434 is shown as integrated with high-speed circuitry 430, in other examples, memory 434 may be an independent standalone element of the eyewear device 100 or 200. In certain such examples, electrical routing lines may provide a connection through a system on chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Server system 498 may be one or more computing devices as part of a service or network computing system, for example, which includes a processor, a memory, and network communication interface to communicate over the network 495 with the mobile device 500 and eyewear devices 100 and 200. Eyewear devices 100 and 200 may be connected with a host computer. For example, the eyewear devices 100 or 200 may be paired with the mobile device 500 via the high-speed wireless connection 437 or connected to the server system 498 via the network 495. Also, a gallery 490 of snapshots and AR objects may be maintained by the server system 498 for each user and invoked by communications providing links to the stored snapshots and AR objects in gallery 490.

Output components of the eyewear devices 100 and 200 include visual components, such as the image displays 180C and 180D of optical assemblies 180A and 180B as described in FIGS. 2C and 2D (e.g., a display such as a liquid crystal display (LCD), a plasma display panel (PDP), a light emitting diode (LED) display, a projector, or a waveguide). The image displays 180C and 180D of the optical assemblies 180A and 180B are driven by the image display driver 442. The output components of the eyewear devices 100 and 200 further include acoustic components (e.g., speakers), haptic components (e.g., a vibratory motor), other signal generators, and so forth. The input components of the eyewear devices 100 and 200, the mobile device 500, and server system 498, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Eyewear devices 100 and 200 may include additional peripheral device elements such as ambient light and spectral sensors, biometric sensors, heat sensor 440, or other display elements integrated with eyewear device 100 or 200. For example, the peripheral device elements may include any I/O components including output components, motion components, position components, or any other such elements described herein. The eyewear devices 100 and 200 can take other forms and may incorporate other types of frameworks, for example, a headgear, a headset, or a helmet.

For example, the biometric components of the eyewear devices 100 and 200 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WI-FI® or BLUETOOTH® transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 425 and 437 from the mobile device 500 via the low-power wireless circuitry 424 or high-speed wireless circuitry 436.

Figure 5:
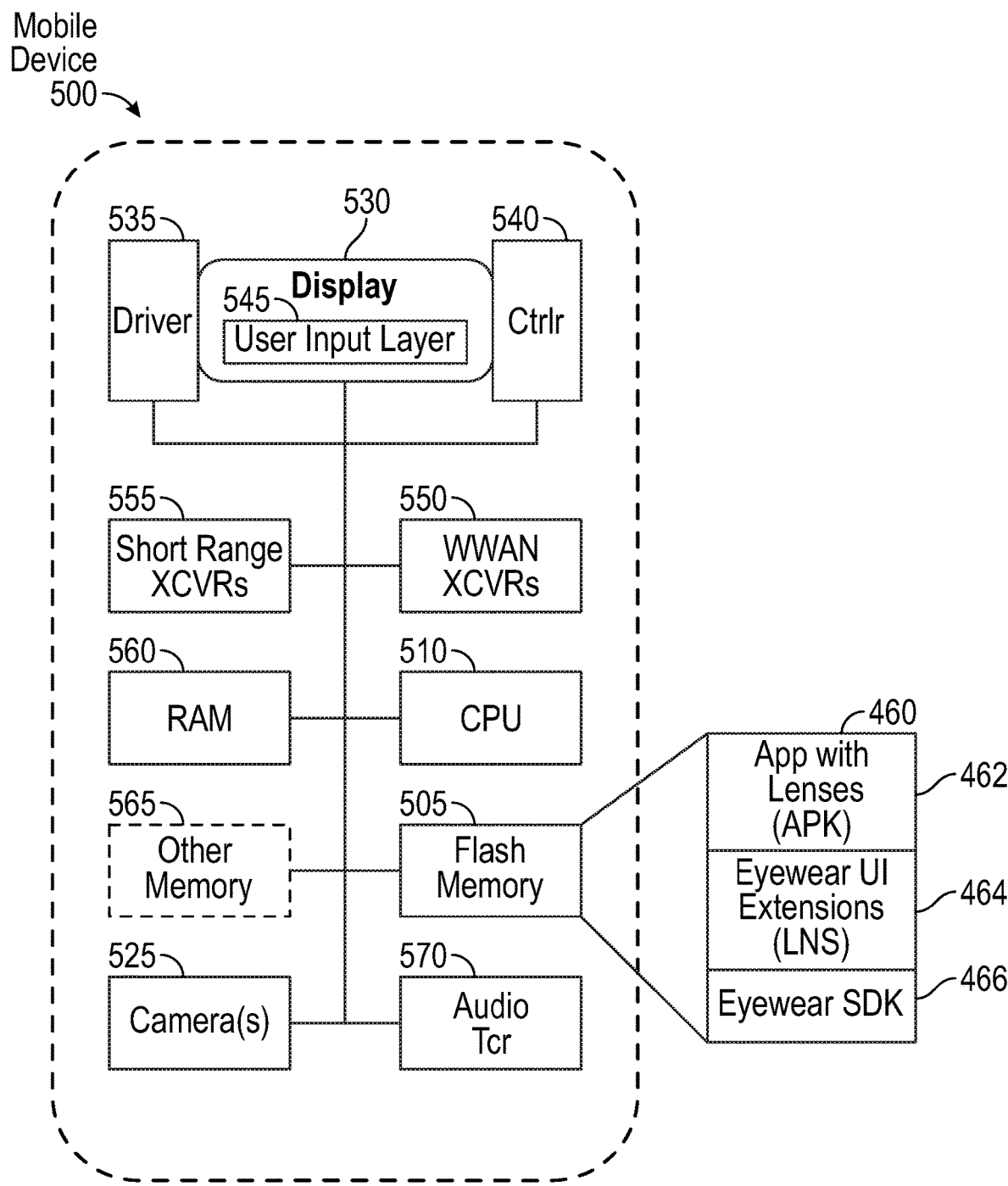
FIG. 5 is a block diagram of electronic components of a mobile device configured for use with the system of FIG. 4.

FIG. 5 is a block diagram depicting a sample configuration of a mobile device 500 for use with the system of FIG. 4. FIG. 5 is a high-level functional block diagram of an example mobile device 500 that a user may use with an eyewear device 100 to extend user interfaces to the eyewear device 100 as described herein. Mobile device 500 may include a flash memory 505 that stores programming to be executed by the CPU 510 to perform all or a subset of the functions described herein. The mobile device 500 may further include a camera 525 that comprises one or more visible-light cameras (first and second visible-light cameras with overlapping fields of view) or at least one visible-light camera and a depth sensor with substantially overlapping fields of view. Flash memory 505 may further include multiple images or video, which are generated via the camera 525.

The mobile device 500 may further include an image display 530, a mobile display driver 535 to control the image display 530, and a display controller 540. In the example of FIG. 5, the image display 530 may include a user input layer 545 (e.g., a touchscreen) that is layered on top of or otherwise integrated into the screen used by the image display 530. Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 500 with a user interface that includes a touchscreen input layer 545 for receiving input (by touch, multi-touch, or gesture, and the like, by hand, stylus, or other tool) and an image display 530 for displaying content.

As shown in FIG. 5, the mobile device 500 includes at least one digital transceiver (XCVR) 550, shown as WWAN (Wireless Wide Area Network) XCVRs, for digital wireless communications via a wide-area wireless mobile communication network. The mobile device 500 also may include additional digital or analog transceivers, such as short-range transceivers (XCVRs) 555 for short-range network communication, such as via NFC, VLC, DECT, ZigBee, BLUETOOTH®, or WI-FI®. For example, short range XCVRs 555 may take the form of any available two-way wireless local area network (WLAN) transceiver of a type that is compatible with one or more standard protocols of communication implemented in wireless local area networks, such as one of the WI-FI® standards under IEEE 802.11.

To generate location coordinates for positioning of the mobile device 500, the mobile device 500 also may include a global positioning system (GPS) receiver. Alternatively, or additionally, the mobile device 500 may utilize either or both the short range XCVRs 555 and WWAN XCVRs 550 for generating location coordinates for positioning. For example, cellular network, WI-FI®, or BLUETOOTH® based positioning systems may generate very accurate location coordinates, particularly when used in combination. Such location coordinates may be transmitted to the mobile device 500 over one or more network connections via XCVRs 550, 555.

The transceivers 550, 555 (i.e., the network communication interface) may conform to one or more of the various digital wireless communication standards utilized by modern mobile networks. Examples of WWAN transceivers 550 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." The transceivers may also incorporate broadband cellular network technologies referred to as "5G." For example, the transceivers 550, 555 provide two-way wireless communication of information including digitized audio signals, still image and video signals, web page information for display as well as web-related inputs, and various types of mobile message communications to/from the mobile device 500.

The mobile device 500 may further include a microprocessor that functions as the central processing unit (CPU) 510. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU 510. The CPU 510, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 510 or processor hardware in smartphone, laptop computer, and tablet.

The CPU 510 serves as a programmable host controller for the mobile device 500 by configuring the mobile device 500 to perform various operations, for example, in accordance with instructions or programming executable by CPU 510. For example, such operations may include various general operations of the mobile device 500, as well as operations related to the programming for messaging apps and AR camera applications on the mobile device 500. Although a processor may be configured by use of hard-wired logic, typical processors in mobile devices are general processing circuits configured by execution of programming.

The mobile device 500 further includes a memory or storage system, for storing programming and data. In the example shown in FIG. 5, the memory system may include flash memory 505, a random-access memory (RAM) 560, and other memory components 565, as needed. The RAM 560 may serve as short-term storage for instructions and data being handled by the CPU 510, e.g., as a working data processing memory. The flash memory 505 typically provides longer-term storage.

Hence, in the example of mobile device 500, the flash memory 505 may be used to store programming or instructions for execution by the CPU 510. Depending on the type of device, the mobile device 500 stores and runs a mobile operating system through which specific applications are executed. Examples of mobile operating systems include Google Android, Apple iOS (for iPhone or iPad devices), Windows Mobile, Amazon Fire OS (Operating System), RIM BlackBerry OS, or the like.

The mobile device 500 may include an audio transceiver 570 that may receive audio signals from the environment via a microphone (not shown) and provide audio output via a speaker (not shown). Audio signals may be coupled with video signals and other messages by a messaging application or social media application implemented on the mobile device 500.

Finally, the mobile device 500 may execute tethered mode application software 460 that is loaded into flash memory 505. In an example, the tethered mode application software 460 may include eyewear enhanced mobile device application software 462 (e.g., navigation software) that has been adapted to incorporate visual overlays into the UI for display on an associated eyewear device 100 as described herein. The adaptation may include eyewear UI extensions software 464 that is a background service responsible for connectivity with the eyewear device 100. The eyewear software development kit (SDK) 466 allows for development of the eyewear UI extensions software 464 to manage connectivity with eyewear device 100 in sample configurations. Tethered mode application software 460 will be described in more detail below with respect to FIGS. 7-10.

Techniques described herein also may be used with one or more of the computer systems described herein or with one or more other systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an ASIC. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionalities, as described herein.

Figure 6:
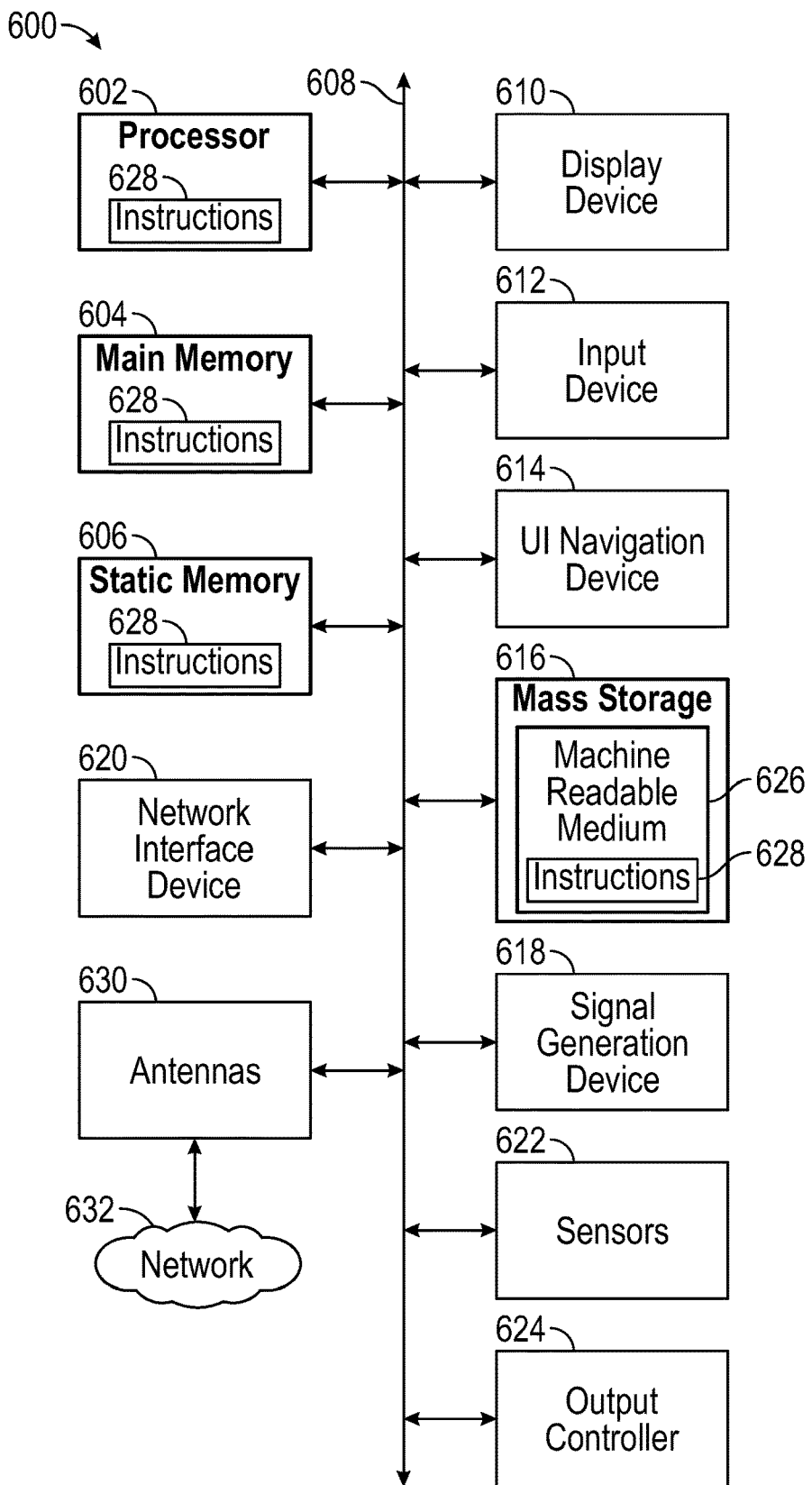
FIG. 6 is a block diagram of a sample back-end server system of the type illustrated in FIG. 4.

The block diagram in FIG. 6 illustrates a computer system for implementation processing elements such as the back-end server system 498 illustrated in FIG. 4. FIG. 6 is a block diagram of a sample machine 600 upon which one or more configurations of a sample back-end server system 498 of the type illustrated in FIG. 4 may be implemented. In alternative configurations, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment.

In sample configurations, the machine 600 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 600 may serve as a workstation, a front-end server, or a back-end server of a communication system. Machine 600 may implement the methods described herein by running the software used to provide visual overlays and other UI features as described herein. Further, while only a single machine 600 is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610 (shown as a video display), an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a mass storage device (e.g., drive unit) 616, a signal generation device 618 (e.g., a speaker), a network interface device 620, and one or more sensors 622. Example sensors 622 include one or more of a global positioning system (GPS) sensor, compass, accelerometer, temperature, light, camera, video camera, sensors of physical states or positions, pressure sensors, fingerprint sensors, retina scanners, or other sensors. The machine 600 also may include an output controller 624, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 616 may include a machine-readable medium 626 on which is stored one or more sets of data structures or instructions 628 (e.g., software) embodying or utilized by any one or more of the techniques or functions described herein. The instructions 628 may also reside, completely or at least partially, within the main memory 604, within static memory 606, or within the hardware processor 602 during execution thereof by the machine 600. In an example, one or any combination of the hardware processor 602, the main memory 604, the static memory 606, or the mass storage device 616 may constitute machine-readable media.

While the machine-readable medium 626 is illustrated as a single medium, the term "machine-readable medium" may include a single medium or multiple media (e.g., at least one of a centralized or distributed database, or associated caches and servers) configured to store the one or more instructions 628. The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories, and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and Digital Video Disks (DVD)-ROM disks. In some examples, machine-readable media may include non-transitory machine-readable media. In some examples, machine-readable media may include machine-readable media that is not a transitory propagating signal.

The instructions 628 may further be transmitted or received over communications network 632 using a transmission medium via the network interface device 620. The machine 600 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as WI-FI®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas 630 to connect to the communications network 632. In an example, the network interface device 620 may include a plurality of antennas 630 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

The features and flow charts described herein can be embodied in one or more methods as method steps or in one more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or other mobile operating systems. In this example, the third-party application can invoke API (Application Programming Interface) calls provided by the operating system to facilitate functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine-readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the programming, media content or meta-data files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory," "tangible," or "storage" media, terms such as computer or machine "readable medium" refer to any medium that participates in providing instructions or data to a processor for execution.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

Software applications for enabling a mobile device application to communicate with an eyewear device to provide a user interface will be described with respect to FIGS. 7-10.

Figure 7A:
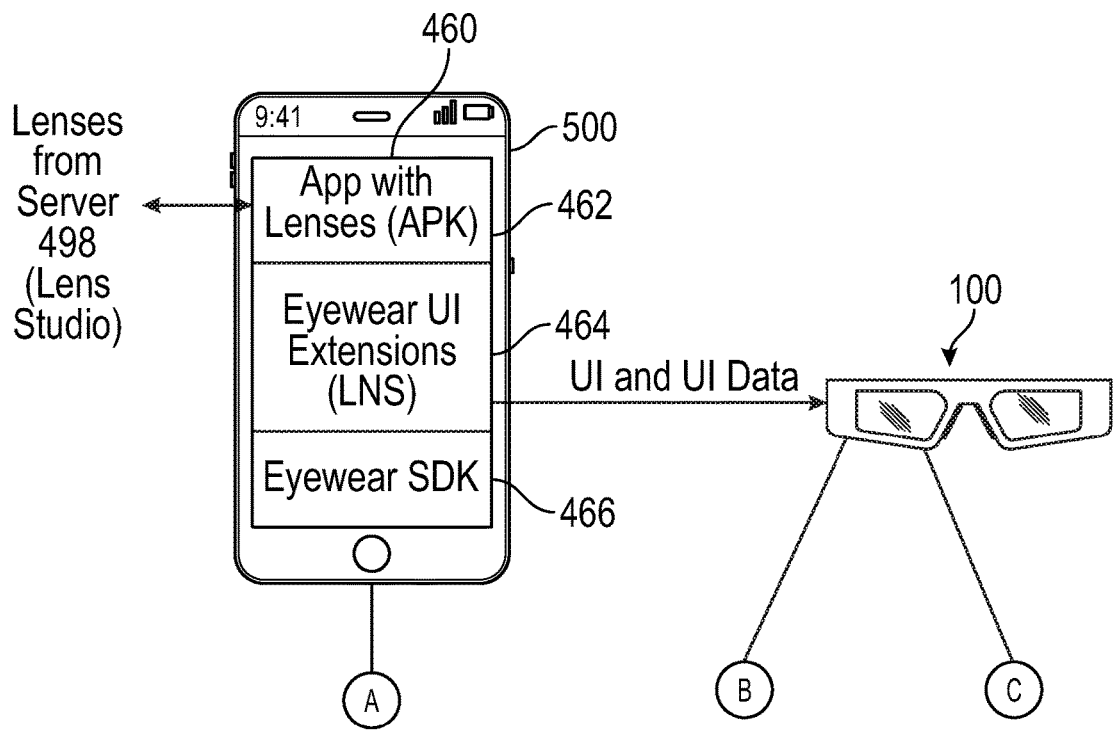
FIG. 7A is a diagram of a mobile phone application that communicates with an eyewear device to provide a user interface in a sample configuration.

FIG. 7A is a diagram of tethered mode application software 460 for implementation by mobile device (e.g., smartphone) 500 for communicating with an eyewear device 100 to provide a user interface (UI) in a sample configuration. As illustrated, the tethered mode application software 460 includes an eyewear-enhanced mobile device application 462, which may be any mobile application that is enhanced with AR capabilities that may be displayed on the eyewear device 100. In a sample configuration, the extension may be in the form of a visual overlay UI plus data bindings for display on the eyewear device 100 (e.g., SPECTACLES™ available from Snap, Inc. of Santa Monica, CA). The tethered mode application software 460 further includes eyewear UI extensions software (LNS) 464 that includes a background service running on the mobile device 500 that is responsible for connectivity with the eyewear device 100 either via connectivity provided by the mobile device application 462 or incorporated into the operating system of the mobile device (e.g., Google Android, Apple iOS (for iPhone or iPad devices), Windows Mobile, Amazon Fire OS (Operating System), RIM BlackBerry OS, or the like). The eyewear UI extensions software 464 provides the user of the mobile device application 462 with the option of rendering all or part of the UI onto the eyewear device 100. The eyewear Software Development Kit (SDK) 466 provides software application developers with an interface for managing connectivity for interacting with the eyewear-enhanced mobile device application 462 and the eyewear device 100 to provide UIs to the eyewear device 100 as described herein.

Figure 7B:
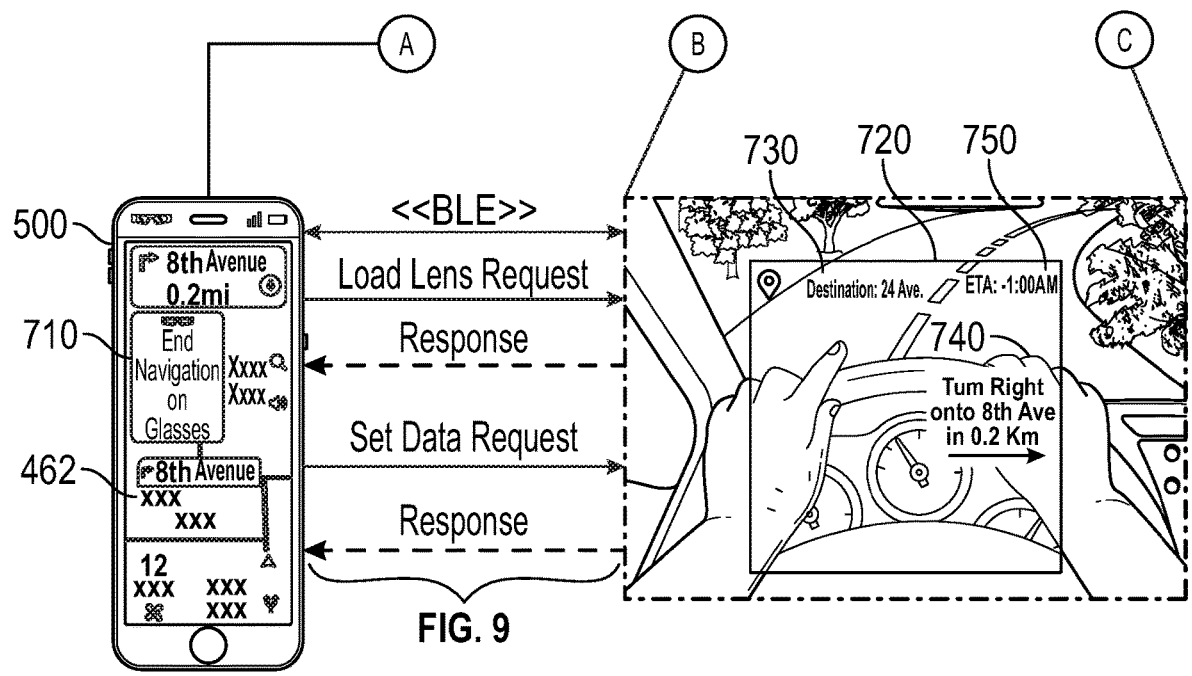
FIG. 7B is a diagram illustrating a display of a user interface on the eyewear device of FIG. 7A as provided by a navigation application running on the mobile device of FIG. 7A.

FIG. 7B is a diagram illustrating a display of a user interface embedded in a display on the right-hand side of the eyewear device 100 of FIG. 7A by an AR enhanced navigation application 462 running on the mobile device 500 of FIG. 7A. As described in more detail below with respect to FIGS. 8 and 9, the mobile device 500 communicates with the eyewear device 100 to enter into a tethered mode whereby UIs of the AR enhanced navigation application 462 are provided as AR overlays to one or more image displays of the eyewear device 100. In sample configurations, the AR overlays may consist only of XML or other files that define a UI in a descriptive way. However, custom application UI images also may be streamed to the display of the eyewear device 100.

For example, in the case of AR enhanced navigation application 462, the user may select to enter into the tethered mode by, for example, selecting a corresponding icon on the display of the mobile device 500. A display 710 may indicate to the user whether the AR enhanced navigation application 462 is in the tethered mode or not. When the AR enhanced navigation application 462 is in the tethered mode, navigation UI features may be overlaid on one or more displays 720 of the eyewear device 100 as illustrated in FIG. 7B. For example, the destination 730, directions 740 (with directional arrow), and time remaining to destination 750 may be overlayed onto the display 720 in the same manner as conventional AR lenses available, for example, in Snapchat, available from Snap, Inc. of Santa Monica, CA. The appearance of the UI elements 720, 730, and 740 is developed by developers using the eyewear SDK 466, while the connectivity (FIGS. 8 and 9) is managed by the eyewear UI extensions software 464. The UIs on the display 720 are updated as the AR enhanced navigation application 462 updates its outputs.

As noted above, the eyewear UI extensions software (LNS) 464 may provide connectivity via the mobile device application 462 or may incorporate the connectivity into the operating system of the mobile device 500. Thus, there are two use cases for the tethered mode:

1. Tethered Mode provided as a third-party app that runs on all the major mobile device operating systems without native operating system support; and
2. Tethered Mode is integrated into the mobile device operating system.

In either tethered mode, UIs (e.g., visual overlays) and binding data are sent from the mobile device 500 to the eyewear device 100. In the case of the "Tethered Mode provided as a third-party app," the eyewear SDK 466 binds to an exposed service of the eyewear UI extensions SDK service 464. On the other hand, in the case of the "Tethered Mode integrated into the mobile device OS," the eyewear SDK 466 binds to an eyewear connectivity service 900 of the operating system. Once bound, the eyewear SDK communicates 466 with the respective service via an OS binder (e.g., Android Binder) by using a well-defined API/contract (e.g., AIDL files on Android). The respective service communicates via BLUETOOTH® Low Energy (BLE) with the paired eyewear device 100.

Figure 8:
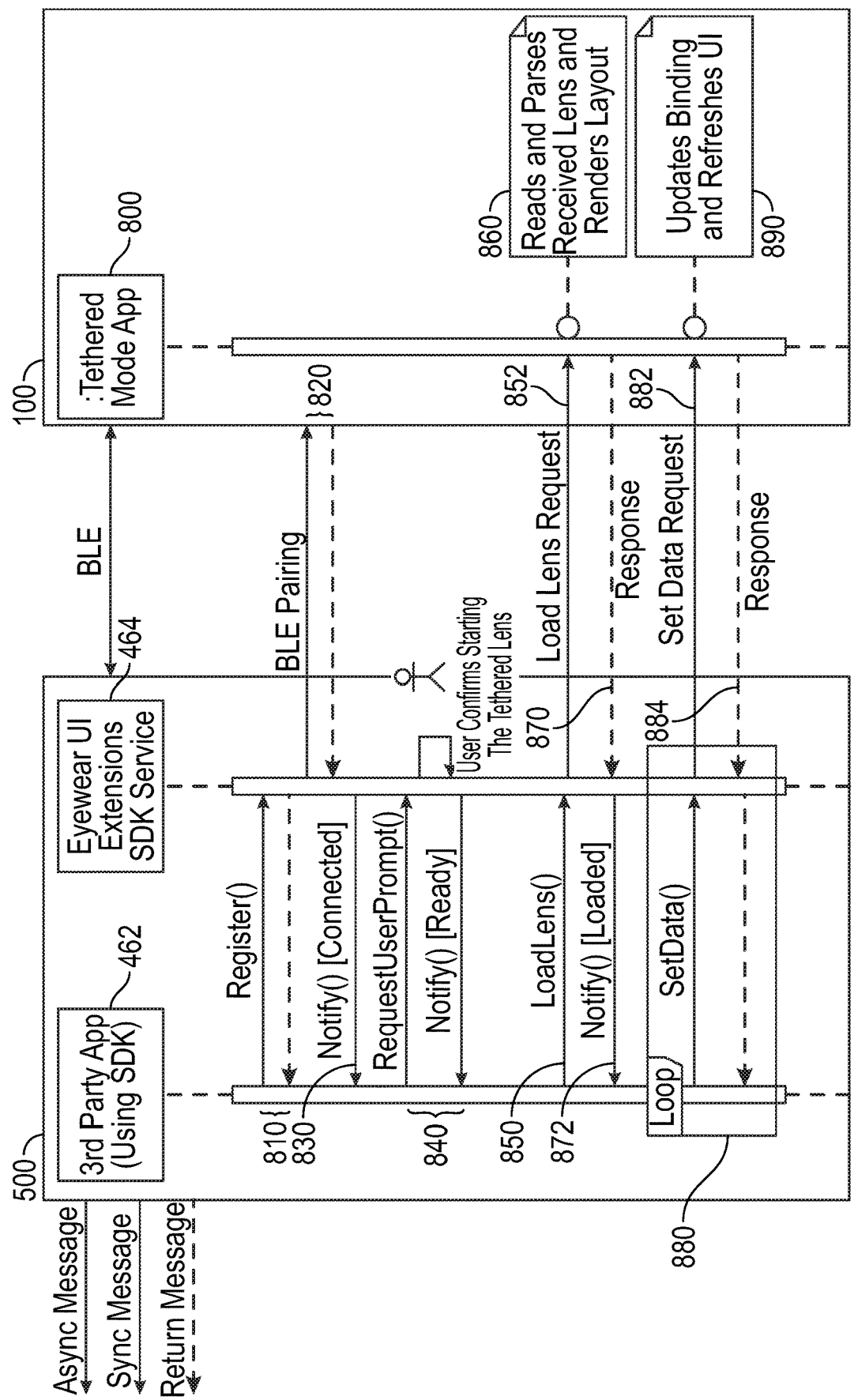
FIG. 8 is a communication diagram of a tethered mode between a mobile device and an eyewear device as provided by a third party application in a sample configuration.
Figure 9:
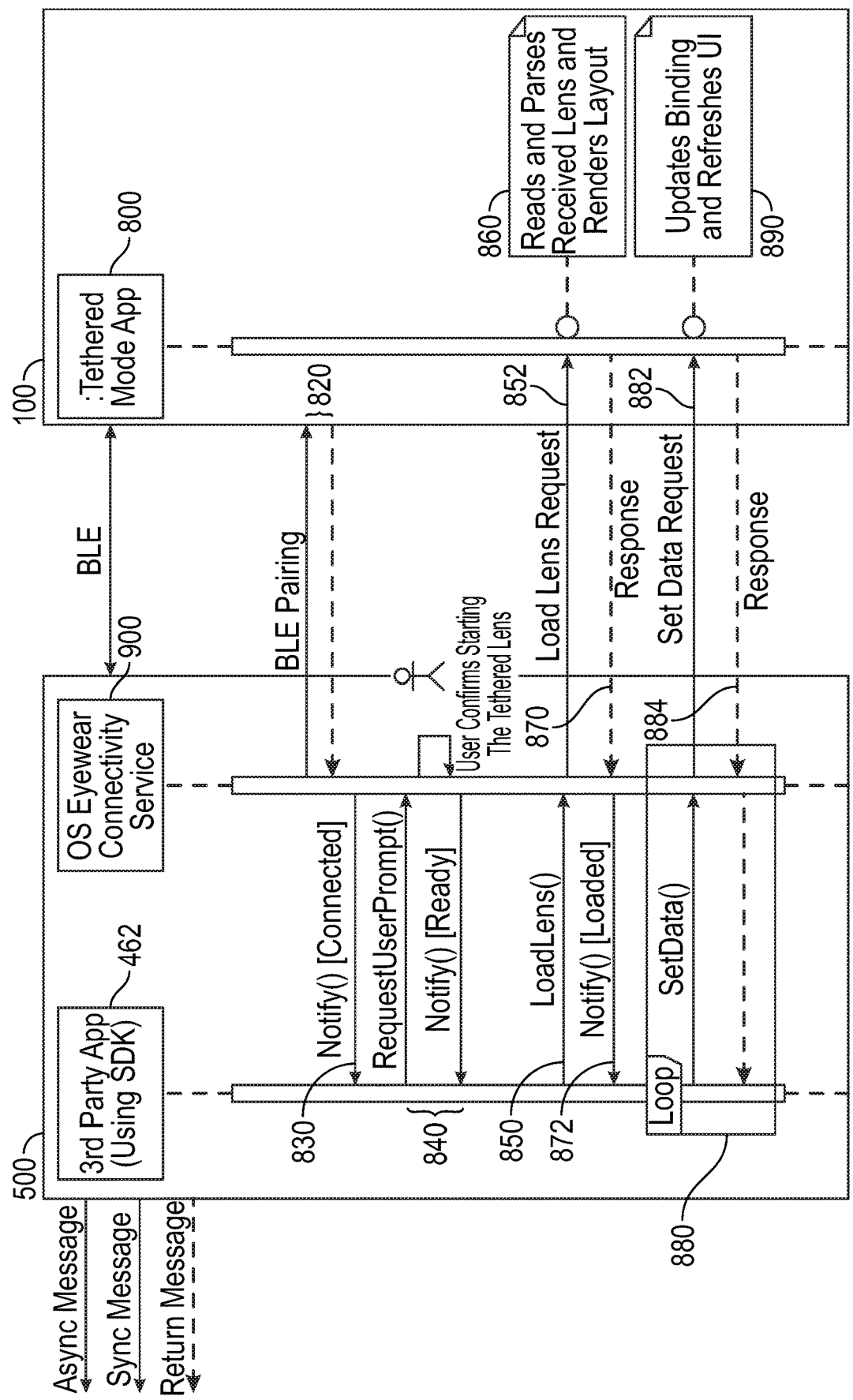
FIG. 9 is a communication diagram of a tethered mode between a mobile device and an eyewear device where the tethered mode is provided by the operating system of the mobile device in a sample configuration.

These use cases are shown in FIGS. 8 and 9, respectively.

Tethered Mode Provided as a Third-Party App

FIG. 8 is a communication diagram of a tethered mode between a mobile device 500 and an eyewear device 100 as provided by a third party application 462 in a sample configuration. As illustrated, communications are established between the communication software (tethered mode application 800) of the eyewear device 100 and the third-party app 462 using eyewear UI extensions SDK service 464. In sample configurations, the tethered mode app 800 may use a lens rendering application or software (e.g., LensCore available from Snap, Inc. of Santa Monica, CA) to render a custom lens generated by a lens generation application or software (e.g., Lens Studio available from Snap, Inc. of Santa Monica, CA) as a visual overlay that is responsible for parsing and rendering the tethered visual overlay sent from the mobile device 500.

In the configuration of FIG. 8, the third-party app 462 uses the eyewear UI extensions SDK service 464 to register itself as an eyewear extension at 810. The eyewear UI extensions SDK service 464 internally uses a service exposed by the third-party app 462 (e.g., SNAPCHAT® available from Snap, Inc. of Santa Monica, CA) to register itself (the third-party app must be installed on the mobile device 500). The exposed service of the eyewear UI extensions SDK service 464 may maintain a list of active registered apps by using APIs of the mobile device operating system (e.g., PackageManager on Android devices). The exposed service of the eyewear UI extensions SDK service 464 also pairs with the eyewear device 100 at 820 using pre-established wireless communications services such as BLE.

The exposed service of the eyewear UI extensions SDK service 464 notifies the third-party app 462 of status changes in state and connectivity of the eyewear device 100 by sending a notification 830. If the third-party app 462 containing eyewear extensions detects (based on receiving the notification 830) that the eyewear 100 is connected and ready to use, the third-party app 462 may propose to the user to show the compatible content on the eyewear 100 instead of the display of the mobile device 500 or on both devices.

For example, a message window 710 (FIG. 7B) may be displayed on the display of a mobile device 500 to indicate to the user the status of the connectivity with the eyewear device 100. Upon selection to enter an eyewear display mode, buttons and/or the display on the mobile device 500 optionally may be grayed out to indicate that the display has been transferred to the eyewear device 100. Users selecting the eyewear display mode may further initiate transfer of the visual overlay to render with the accompanying data to eyewear device 100 over BLE or WI-FI® Direct or other wireless communications configurations by sending a request at 840.

Once the exposed service of the eyewear UI extensions SDK service 464 has indicated at 840 that the connection with the eyewear 100 is complete and the tethered mode is active, the third-party app 462 requests that the UI visual overlays for the third-party app 462 be loaded at 850. The exposed service of the eyewear UI extensions SDK service 464 further sends a visual overlay (e.g., lens) load request 852 to the eyewear device 100. Upon receipt of visual overlay load request 852, the tethered mode application 800 of the eyewear device 100 reads and parses the received visual overlay and renders the appropriate UI layout at 860 for display on the eyewear device 100. The tethered mode application 800 may further provide a response 870 to the exposed service of the eyewear UI extensions SDK service 464 which, in turn, notifies the third-party app 462 at 872 that the visual overlay or visual overlays have been loaded.

Once the visual overlays have been loaded, the eyewear device 100 is ready for use with the third-party application 462. At 880, the third-party app 462 provides UI data for display on the eyewear device 100. The UI data is provided by the exposed service of the eyewear UI extensions SDK service 464 to the tethered mode app 800 as a set data request 882 for display on the eyewear device 100. The tethered mode app 800 updates the bindings and refreshes the UI of the eyewear device at 890. A response 884 is provided indicating the status of the set data request 882. The steps 880, 882, 884, and 890 are repeated as the third-party app 462 provides updated UI data during execution of the third-party app 462. At any time during this process, the user may put on the eyewear device 100 and view UIs from the third-party app 462 as an overlay on the display of the eyewear device 100 (see FIG. 7B). The eyewear display mode may continue until the eyewear display mode is terminated either on the eyewear device 100 (e.g., by voice command) or by appropriate button or voice selection on the mobile device 500.

Tethered Mode Integrated into OS of Mobile Device

FIG. 9 is a communication diagram of a tethered mode between a mobile device 500 and an eyewear device 100 where the tethered mode is provided by the operating system of the mobile device 500 in a sample configuration. It will be appreciated that the communications in this configuration is the same as in FIG. 8 except that the connectivity between the mobile device 500 and the eyewear device 100 is provided by an integrated eyewear connectivity service 900 of the operating system of the eyewear device 500 instead of a service of the eyewear UI extensions SDK service 464.

In the configuration of FIG. 9, the third-party app 462 indicates that it contains an eyewear UI extension by declaring the appropriate eyewear category in its operating system manifest (e.g., AndroidManifest.xml for Android OS). A package manager (e.g., Android PackageManager) may maintain a list of active apps in the declared eyewear category. The package manager may notify the active apps in the declared eyewear category of any status changes in the eyewear state and connectivity. The eyewear connectivity service 900 of the operating system may maintain a list of active apps by using the package manager APIs of the mobile device operating system. The eyewear connectivity service 900 of the operating system may further pair with the eyewear device 100 at 820 using pre-established wireless communications services such as BLUETOOTH® Low Energy (BLE).

The eyewear connectivity service 900 of the operating system notifies the third-party app 462 of status changes in state and connectivity of the eyewear device 100 by sending a notification 830. If the third-party app 462 containing eyewear extensions detects (based on receipt of the notification 830) that the eyewear 100 is connected and ready to use, the third-party app 462 may propose to the user to show the compatible content on the eyewear 100 instead of the display of the mobile device 500 or on both devices. For example, a message window 710 (FIG. 7B) may be displayed on the display of mobile device 500 to indicate to the user the status of the connectivity with the eyewear device 100. Upon selection to enter an eyewear display mode, buttons and/or the display on the mobile device 500 optionally may be grayed out to indicate that the display has been transferred to the eyewear device 100. Users selecting the eyewear display mode may initiate transfer of the visual overlay to render with the accompanying data to eyewear device 100 over BLE or WI-FI® Direct by sending a request at 840.

Once the eyewear connectivity service 900 of the operating system has indicated at 840 that the connection with the eyewear 100 is complete and the tethered mode is active, the third-party app 462 may request that UI visual overlays for the third-party app 462 be loaded at 850. The eyewear connectivity service 900 of the operating system further sends a visual overlay load request 852 to the eyewear device 100. Upon receipt of visual overlay load request 852, the tethered mode application 800 of the eyewear device 100 reads and parses the received visual overlay and renders the appropriate UI layout at 860 for display on the eyewear device 100. The tethered mode application 800 may further provide a response 870 to the eyewear connectivity service 900 of the operating system which, in turn, notifies the third-party app 462 at 872 that the visual overlay or visual overlays have been loaded.

Once the visual overlays have been loaded, the eyewear device 100 is ready for use with the third-party application 462. At 880, the third-party app 462 provides UI data for display on the eyewear device 100. The UI data is provided by the eyewear connectivity service 900 of the operating system to the tethered mode app 800 as a set data request 882 for display on the eyewear device 100. The tethered mode app 800 updates the bindings and refreshes the UI of the eyewear device at 890. A response 884 is provided indicating the status of the set data request 882. The steps 880, 882, 884, and 890 are repeated as the third-party app 462 provides updated UI data during use. At any time during this process, the user may put on the eyewear device 100 and view UIs from the third-party app 462 as an overlay on the display of the eyewear device 100 (see FIG. 7B). The eyewear display mode may continue until the eyewear display mode is terminated either on the eyewear device 100 (e.g., by voice command) or by appropriate button or voice selection on the mobile device 500.

Figure 10:
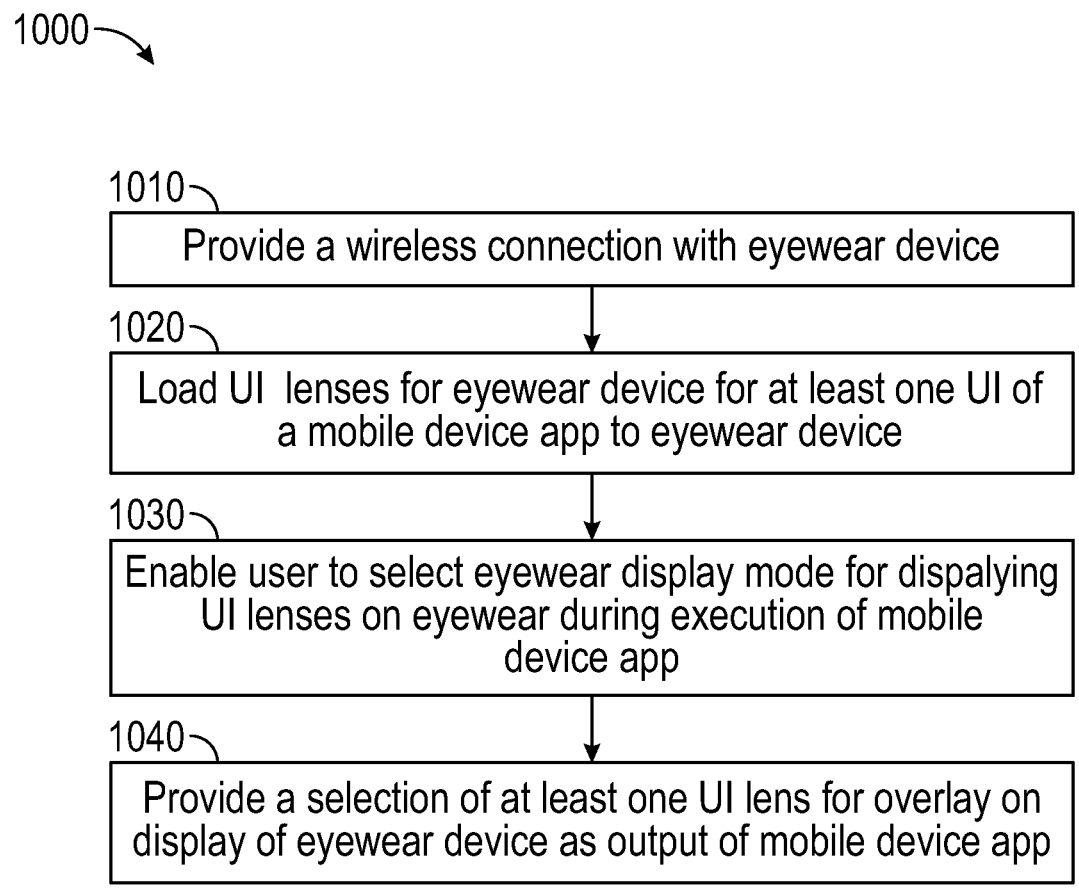
FIG. 10 is a flow chart of the method for providing UIs of a mobile device application to an associated eyewear device in a sample configuration.

FIG. 10 is a flow chart of the method 1000 for providing UIs of a mobile device application 462 to an associated eyewear device 100 in a sample configuration.

At 1010 a wireless connection (e.g., a BLE connection) is established between the mobile device 500 and the eyewear device 100 by establishing a tethered mode between the mobile device 500 and the eyewear device 100 using either of the respective techniques described with respect to FIG. 8 and FIG. 9.

At 1020, once the wireless connection is established, the mobile device 500 may load to the eyewear device 100, via the wireless connection, visual overlays adapted for the eyewear device 100 for at least one user interface of the mobile device application 462. The visual overlays may be lenses downloaded from an application that enables developers to select lenses to build augmented reality experiences (e.g., Lens Studio) or lenses independently created by an application developer.

At 1030, the mobile device application 462 enables a user to select an eyewear display mode for displaying one or more of the loaded visual overlays adapted for the eyewear device 100 during execution of the mobile device application 462. The mobile device application 462 may present a button or other selection feature to the display of the mobile device application 462 for selection of an eyewear device display mode.

At 1040, in the eyewear device display mode, a selection of at least one of the loaded visual overlays for overlay on a display of the eyewear device 100 as an output of the mobile device application 462 is provided to the eyewear device 100 via the wireless connection. The eyewear device 100 may present the selected visual overlays as an overlay on the display of the eyewear device in response to outputs of the mobile device application 462, thereby extending the UI of the mobile device application 462 to the eyewear device 100.

In an example where the third-party app 462 is a navigation application with eyewear UI extensions as illustrated in FIG. 7B, the user may type the destination address on the mobile device 500, confirm the destination location, choose to "navigate," and then choose to present the directions on the eyewear 100 instead of a mobile device 500. This would prompt sending of the navigation app visual overlay UIs including the destination location (e.g., street name rendering box) 730, directions with direction arrows 740, and estimated arrival time 750 to the eyewear device 100. Subsequently, based on the GPS location of the mobile device 500, the navigation app 462 may instruct the eyewear device 100 on what to show at a moment, e.g. "turn right onto 8$^{th}$ Avenue" and render the instruction with a right arrow at 740.

The UIs for display on the eyewear device 100 may be established using the eyewear SDK 466. Many simple layout capabilities may be supported that allow application developers to define layouts for the tethered visual overlay in a descriptive way and to use data bindings to set and update data. In sample configurations, the layouts may be XML files added to the resources of the application in the same manner as regular OS layout files. In sample configurations, the user can package a lens created in LensStudio into the mobile device application. That lens then will be sent over to the eyewear device 100 and rendered there. Alternatively, a simple way of defining non-complex UI layouts may be provided via an XML file that may, for example, define how to render an image on the left side of the field of view vertically centered and a text at the top of the field of view horizontally centered and use a data binding to update the text (e.g., using a key as a variable for the text content that can be updated via an update message sent from the mobile device). The mobile application 462 may send those XML files (along with reference images) to the eyewear device 100. A generic lens may then parse the XML(s) and render the items based on the definition.

The XML for the above example could look like this:

```
<ui>
<img position="left,center" src="leftArrow.png">
<text position="center,top" text="$text1" fontSize="10">
</ui>
```

An update message may contain a dictionary containing data binding updates including ("text1"=>"Hello World").

An example UI layout in XML format for sending navigation text from mobile device 500 to eyewear device 100 may be provided as follows for an Android OS:

```
<?xml version="1.0" encoding="utf-8"?>
<LinearLayout
    xmlns:snap="http://schemas.snap.com/tetheredmode/res/android"
        snap:layout_width="match_parent"
        snap:layout_height="match_parent"
        snap:orientation="horizontal" >
    <Image View
        snap:layout_width="wrap_content"
        snap:layout_height="wrap_content"
        snap:src="@drawable/navigate_left_icon"
        snap:visible="#navigate_left"/>
    <TextView
        snap:layout_width="wrap_content"
        snap:layout_height="wrap_content"
        snap:text="#navigation_text" />
    <ImageView
        snap:layout_width="wrap_content"
        snap:layout_height="wrap_content"
        snap:src="@drawable/navigate_right_icon"
        snap:visible="#navigate_right"/>
</LinearLayout>
```

In sample configurations, the eyewear device 100 may operate as a "dumb" receiver that simply receives the XML data for display. However, in other configurations, the eyewear device 100 may process voice, touch, and/or gesture commands whereby the wearer of the eyewear device 100 may provide instructions that are interpreted to interact with the third-party app 462. For example, if the third-party app 462 is a cooking app, the eyewear device 100 may interpret voice commands such as "previous" or "next" to move between steps in the recipe displayed on her eyewear device 100 without having to use her hands to move between steps in the recipe. Other keywords may also be provided and interpreted as appropriate for the third-party app 462.

When developing the UIs for the third-party app 462, the developer may use the eyewear SDK 466 to register the third-party app 462, load a UI layout, and update the data. For example, code to register an app (itself) and to load the above layout for a navigation app to be used with SPECTACLES™ available from Snap, Inc. of Santa Monica, CA, may be provided as:

```
var updateData = ( ) => {
    SpectaclesServiceApi.setData(mapOf(
        "navigation_text" to "Go right"
        "navigate_left" to "false"
        "navigate_right" to true
    ))
}
SpectaclesServiceApi.register( )
SpectaclesServiceApi.setStateChangeListener((state) => {
    when(state) {
```

```
CONNECTED -> SpectaclesServiceApi.requestUserPrompt( )
READY -> SpectaclesServiceApi.load(R.layout.simple_layout)
LOADED -> updateData( )
  }
})
```

To make it easier for third-party app developers and to use a familiar pattern, the eyewear SDK 466 may follow standard OS conventions. For example, for Android OS, a new resource category for the eyewear ("spectacles" in the above example) is provided under "res" (for resource) that contains the UI visual overlays for the app's eyewear extensions. This may be represented as follows:

```
MyApplication/
  src/
    MyActivity.java
  res/
    drawable/
      graphic.png
    layout/
      main.xml
      info.xml
    mipmap/
      Icon.png
    spectacles/
      lens1.lns
      lens2.lns
      lens3.lns
    values/
      strings.xml
```

In this example, lenses 1-3 are transferred from Lens Studio to the third-party app 462 for use as the UI for the eyewear device 100. Alternatively, the developer could add lenses to the Lens Studio or create new UIs that are unique to the third-party app 462 for display on the eyewear device 100. For example, the developer may download lenses for up, down, left, and right directional arrows. On the other hand, the developer may create a new graphic corresponding to the respective directional arrows.

In the case of a lens based UI, the lenses may be downloaded into the third-party app 462 on demand or UIs may be created by a developer that are unique to the third-party app 462. The lenses may be obtained from a Lens Studio implemented by backend server 498, for example. Once the UI has been created and loaded into the eyewear device 100 and the eyewear display mode established, the eyewear UIs responsive to the mobile device ap 462 may be displayed automatically.

The scope of protection is limited solely by the claims that now follow. That scope is intended and should be interpreted to be as broad as is consistent with the ordinary meaning of the language that is used in the claims when interpreted considering this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are the best mode and other examples, it is understood that various modifications may be made therein and that the subject matter disclosed herein may be implemented in various forms and examples, and that they may be applied in numerous applications, only some of which have been described herein. It is intended by the following claims to claim all modifications and variations that fall within the true scope of the present concepts.

What is claimed is:

1. A mobile device adapted to provide a user interface (UI) for a mobile device application executed thereon to an eyewear device, comprising:
   a display;
   a memory that stores instructions; and
   a processor coupled to the display and the memory, wherein the processor executes the instructions to configure the mobile device to:
   provide a wireless connection with the eyewear device;
   load to the eyewear device, via the wireless connection, visual overlays adapted for the eyewear device for at least one user interface of the mobile device application;
   enable a user to select a tethered mode for displaying on the eyewear device or on the mobile device and the eyewear device one or more of the loaded visual overlays and data bindings adapted for the eyewear device during execution of the mobile device application, the data bindings setting and updating data provided to the eyewear device; and provide, via the wireless connection, a selection of at least one of the loaded visual overlays for overlay on a display of the eyewear device as an output of the mobile device application while the eyewear device remains in the tethered mode.

2. The mobile device as in claim 1, further comprising eyewear UI extensions software including a background service that is executed by the processor to establish the wireless connection with the eyewear device.

3. The mobile device as in claim 2, wherein the background service exposes a service to the mobile device application for communicating with the eyewear device via the wireless connection.

4. The mobile device as in claim 2, wherein the mobile device application exposes a service of the eyewear UI extensions software to register itself as an eyewear extension.

5. The mobile device as in claim 4, wherein the exposed service of the eyewear UI extensions software maintains a list of active registered mobile device applications.

6. The mobile device as in claim 1, further comprising an operating system having an eyewear connectivity service that is executed by the processor to establish the wireless connection with the eyewear device.

7. The mobile device as in claim 6, wherein the eyewear connectivity service is exposed to the mobile device application for communicating with the eyewear device via the wireless connection.

8. The mobile device as in claim 6, wherein the mobile device application indicates that it contains an eyewear UI extension by declaring an eyewear category in its operating system manifest.

9. The mobile device as in claim 8, wherein the eyewear connectivity service of the operating system maintains a list of active mobile device applications in the declared eyewear category.

10. The mobile device as in claim 1, further comprising an eyewear Software Development Kit (SDK) that provides an interface for managing connectivity between the mobile device application and the eyewear device via the wireless connection.

11. The mobile device as in claim 10, wherein the eyewear SDK provides layouts for the visual overlays that enable definition of layouts for the loaded visual overlays in a descriptive way and use of the data bindings to set and update data provided to the eyewear device via the wireless connection.

12. The mobile device as in claim 11, wherein the layouts comprise XML files that are added to resources of the mobile device application.

13. The mobile device as in claim 1, further comprising instructions that when executed by the processor configure the mobile device application to present an icon on the display indicating connectivity status of the mobile device and the eyewear.

14. A method of providing a user interface (UI) for a mobile device application executed on a mobile device to an eyewear device that communicates with the mobile device via a wireless connection, comprising:

establishing the wireless connection between the mobile device and the eyewear device;

loading from the mobile device to the eyewear device, via the wireless connection, visual overlays adapted for the eyewear device for at least one user interface of the mobile device application;

enabling a user to select a tethered mode for displaying on the eyewear device or on the mobile device and the eyewear device one or more of the loaded visual overlays and data bindings adapted for the eyewear device during execution of the mobile device application, the data bindings setting updating data provided to the eyewear device; and providing, via the wireless connection, a selection of at least one of the loaded visual overlays for overlay on a display of the eyewear device as an output of the mobile device application while the eyewear device remains in the tethered mode.

15. The method of claim 14, wherein establishing the wireless connection between the mobile device and the eyewear device comprises a background service of eyewear UI extensions software of the mobile device exposing a service to the mobile device application for communicating with the eyewear device via the wireless connection.

16. The method of claim 15, further comprising the mobile device application registering itself as an eyewear extension using an exposed service of the eyewear UI extensions software and maintaining, by the exposed service of the eyewear UI extensions software, a list of active registered mobile device applications.

17. The method of claim 14, wherein establishing the wireless connection between the mobile device and the eyewear device comprises an operating system of the mobile device establishing the wireless connection with the eyewear device by exposing an eyewear connectivity service of the operating system to the mobile device application that enables the mobile device application to communicate with the eyewear device via the wireless connection.

18. The method of claim 17, further comprising the mobile device application indicating that it contains an eyewear UI extension by declaring an eyewear category in its operating system manifest and the eyewear connectivity service of the operating system maintaining a list of active mobile device applications in the declared eyewear category.

19. The method of claim 14, further comprising providing an interface for managing connectivity between the mobile device application and the eyewear device via the wireless connection and adding XML files for the visual overlays to resources of the mobile device application, the XML files defining layouts for the loaded visual overlays in a descriptive way and using the data bindings to set and update data provided to the eyewear device via the wireless connection.

20. A non-transitory computer-readable storage medium that stores instructions that when executed by at least one processor cause the at least one processor to provide a user interface for a mobile device application executed on a mobile device to an eyewear device that communicates with the mobile device via a wireless connection by performing operations including:

establishing the wireless connection between the mobile device and the eyewear device;

loading from the mobile device to the eyewear device, via the wireless connection, visual overlays adapted for the eyewear device for at least one user interface of the mobile device application;

enabling a user to select a tethered mode for displaying on the eyewear device or on the mobile device and the eyewear device one or more of the loaded visual overlays and data bindings adapted for the eyewear device during execution of the mobile device application, the data bindings setting and updating data provided to the eyewear device; and providing, via the wireless connection, a selection of at least one of the loaded visual overlays for overlay on a display of the eyewear device as an output of the mobile device application while the eyewear device remains in the tethered mode.

* * * * *